US012583648B2

(12) United States Patent
Li et al.

(10) Patent No.: US 12,583,648 B2
(45) Date of Patent: Mar. 24, 2026

(54) PORTABLE FLUID TANK SYSTEM WITH MOUNTING ASSEMBLY

(71) Applicant: Black & Decker Inc., New Britain, CT (US)

(72) Inventors: Yin Li, Suzhou (CN); Robert John Cirincione, II, Cockeysville, MD (US); Shi Xiang Wei, Suzhou (CN); Heather M. Lockhart, Buffalo, NY (US)

(73) Assignee: Black & Decker Inc., New Britain, CT (US)

(*) Notice: Subject to any disclaimer, the term of this patent is extended or adjusted under 35 U.S.C. 154(b) by 253 days.

(21) Appl. No.: 18/415,028

(22) Filed: Jan. 17, 2024

(65) Prior Publication Data

US 2025/0229946 A1 Jul. 17, 2025

(51) Int. Cl.
*B65D 21/02* (2006.01)
*B65D 1/22* (2006.01)
(Continued)

(52) U.S. Cl.
CPC ........... *B65D 21/0237* (2013.01); *B65D 1/22* (2013.01); *B65D 21/023* (2013.01);
(Continued)

(58) Field of Classification Search
CPC .............. B65D 21/023; B65D 21/0237; B65D 21/0238; B65D 21/38; B65D 21/0217;
(Continued)

(56) References Cited

U.S. PATENT DOCUMENTS 3,317,141 A 5/1967 Carl
D315,867 S 4/1991 Hestehave et al.
(Continued)

FOREIGN PATENT DOCUMENTS

CN 200987334 Y 12/2007
CN 201714464 U 1/2011
(Continued)

OTHER PUBLICATIONS

Portable Fluid Tank System With Multi-State Control Interface and Remote Operation, U.S. Appl. No. 18/415,043, filed Jan. 17, 2024.
(Continued)

*Primary Examiner* — Paul R Durand
*Assistant Examiner* — Randall A Gruby
(74) *Attorney, Agent, or Firm* — Stanek Lemon Crouse & Meeks, PA

(57) ABSTRACT

A portable fluid tank system can include a mounting assembly for secure and adaptable attachment to external docking assemblies. The portable fluid tank system can include a fluid tank with an internal volume for fluid storage and a fluid actuation system for controlled fluid movement and pressurization. An electronics housing within the portable fluid tank system can accommodate a removable energy storage device, providing power to the actuation system. The mounting assembly can include a first engagement member on the fluid tank, configured to mechanically engage with a complementary second engagement member on an external docking assembly. This engagement facilitates the secure attachment of the portable fluid tank system to the docking assembly. The mounting assembly can include a mounting frame, contoured to match the exterior geometry of the fluid tank and extend around its periphery.

13 Claims, 18 Drawing Sheets

(51) Int. Cl.

*B65D 25/28* (2006.01)
*B65D 25/38* (2006.01)
*F04B 43/02* (2006.01)
*B28D 7/02* (2006.01)

(52) U.S. Cl.

CPC ..... *B65D 25/2885* (2013.01); *B65D 25/2894* (2013.01); *B65D 25/38* (2013.01); *F04B 43/02* (2013.01); *B28D 7/02* (2013.01)

(58) Field of Classification Search

CPC . B65D 21/0219; B65D 21/0223; F16M 13/02
USPC ...... 220/23.83, 630, 636; 206/508, 509, 511
See application file for complete search history.

(56) References Cited

U.S. PATENT DOCUMENTS

| | | | |
|---|---|---|---|
| 5,150,841 A | 9/1992 | Silvenis et al. | |
| D358,330 S | 5/1995 | Kahl | |
| 5,597,097 A | 1/1997 | Morris | |
| 5,996,907 A | 12/1999 | Toetschinger et al. | |
| D514,940 S | 2/2006 | Darr et al. | |
| 7,118,050 B1 | 10/2006 | Chen | |
| 7,182,214 B2 | 2/2007 | Darr et al. | |
| 7,237,729 B2 | 7/2007 | Chen | |
| 7,347,386 B2 | 3/2008 | Chen | |
| D588,313 S | 3/2009 | Conner et al. | |
| 7,631,818 B2 | 12/2009 | Wu | |
| 7,753,290 B2 | 7/2010 | Jacques et al. | |
| 8,109,364 B2 | 2/2012 | Phillips et al. | |
| 8,141,754 B2 | 3/2012 | Conner et al. | |
| 8,490,241 B2 * | 7/2013 | Ricklefsen | B25H 3/00 15/327.2 |
| 8,556,192 B2 | 10/2013 | Wise | |
| 8,597,505 B2 | 12/2013 | Fulkerson et al. | |
| 8,893,924 B2 | 11/2014 | Cash et al. | |
| 8,979,100 B2 | 3/2015 | Bensman et al. | |
| D732,393 S | 6/2015 | Senus | |
| 9,095,992 B2 | 8/2015 | Reuterberg et al. | |
| 9,187,210 B2 * | 11/2015 | Zhu | E05C 19/14 |
| 9,302,809 B1 | 4/2016 | Hooper | |
| 9,334,085 B2 | 5/2016 | Persson et al. | |
| 9,375,742 B1 | 6/2016 | Yoked | |
| 9,393,684 B2 | 7/2016 | Christopher et al. | |
| 9,403,613 B2 | 8/2016 | Adams | |
| 9,845,171 B2 | 12/2017 | Conway et al. | |
| 9,862,539 B2 | 1/2018 | Reuterberg et al. | |
| RE47,022 E | 9/2018 | Sosnovsky et al. | |
| D832,890 S | 11/2018 | Franks | |
| 10,226,781 B2 | 3/2019 | Franks | |
| 10,512,944 B2 | 12/2019 | Rickey et al. | |
| D887,277 S | 6/2020 | Allison | |
| 10,766,046 B2 | 9/2020 | Fontaine et al. | |
| 10,775,128 B2 | 9/2020 | Thomann | |
| 10,799,838 B1 | 10/2020 | Brookins | |
| 10,799,839 B1 | 10/2020 | Brookins | |
| 11,009,312 B2 | 5/2021 | Thomann | |
| 11,103,886 B2 | 8/2021 | Harvey et al. | |
| 11,135,621 B2 | 10/2021 | Liu et al. | |
| 11,230,410 B2 | 1/2022 | Brunner | |
| 11,235,343 B2 | 2/2022 | Nolte et al. | |
| 11,331,605 B2 | 5/2022 | Azuma et al. | |
| 11,426,746 B2 * | 8/2022 | Sugiura | B05B 9/0426 |
| 11,639,678 B2 | 5/2023 | Richardson | |
| 11,642,683 B2 | 5/2023 | Mantes et al. | |
| 11,925,949 B1 | 3/2024 | Craig | |
| 2005/0006400 A1 | 1/2005 | Shapanus et al. | |
| 2005/0051575 A1 | 3/2005 | Durivage | |
| 2006/0027680 A1 | 2/2006 | Wu | |
| 2006/0184293 A1 | 8/2006 | Konandreas et al. | |
| 2007/0023384 A1 | 2/2007 | Janeczek | |
| 2007/0114245 A1 | 5/2007 | Trent | |
| 2007/0278326 A1 | 12/2007 | Wu | |
| 2009/0068036 A1 | 3/2009 | Hsu et al. | |
| 2010/0155434 A1 | 6/2010 | Bradford | |
| 2011/0011886 A1 | 1/2011 | Zaima et al. | |
| 2011/0042487 A1 | 2/2011 | Cai et al. | |
| 2011/0144616 A1 | 6/2011 | Michaud et al. | |
| 2012/0325866 A1 | 12/2012 | Lee et al. | |
| 2015/0050169 A1 | 2/2015 | Horie et al. | |
| 2015/0251223 A1 | 9/2015 | Horie et al. | |
| 2019/0000066 A1 | 1/2019 | Gutsmann et al. | |
| 2019/0099560 A1 | 4/2019 | Gray | |
| 2019/0298122 A1 | 10/2019 | Tahara et al. | |
| 2019/0388923 A1 | 12/2019 | Giacalone et al. | |
| 2020/0050223 A1 | 2/2020 | Lange et al. | |
| 2021/0046494 A1 | 2/2021 | Lam et al. | |
| 2021/0221561 A1 | 7/2021 | Davidian et al. | |
| 2021/0268552 A1 | 9/2021 | Zha et al. | |
| 2021/0283628 A1 | 9/2021 | Tan | |
| 2022/0126311 A1 | 4/2022 | Doher et al. | |
| 2022/0134369 A1 | 5/2022 | Gustafson et al. | |
| 2022/0241803 A1 | 8/2022 | Doher et al. | |
| 2023/0027343 A1 | 1/2023 | Zheng et al. | |

FOREIGN PATENT DOCUMENTS

| | | |
|---|---|---|
| CN | 104492631 A | 4/2015 |
| CN | 106623174 A | 5/2017 |
| CN | 113134440 B | 7/2021 |
| DE | 2425809 A1 | 12/1975 |
| DE | 202014011460 | 1/2021 |
| EP | 3528971 | 8/2019 |
| EP | 3587294 B1 | 1/2020 |
| JP | 2005289513 A | 10/2005 |
| JP | 2013169490 A | 9/2013 |
| JP | 2014100115 A | 6/2014 |
| JP | 2014100687 A | 6/2014 |
| KR | 102428561 B1 | 8/2022 |
| WO | 2016095988 A1 | 6/2016 |
| WO | 2016115809 A1 | 7/2016 |
| WO | 2018072156 A1 | 4/2018 |
| WO | 2023038917 A1 | 3/2023 |
| WO | 2023070136 A1 | 4/2023 |

OTHER PUBLICATIONS

Portable Fluid Tank System With Angled Spill Face, U.S. Appl. No. 18/415,050, filed Jan. 17, 2024.

Portable Fluid Tank System With Dual Handle, U.S. Appl. No. 18/415,069, filed Jan. 17, 2024.

Portable Fluid Tank System With Diaphragm Pump, U.S. Appl. No. 18/415,088, filed Jan. 17, 2024.

Portable Fluid Tank System With Biased Compartment Door, U.S. Appl. No. 18/415,105, filed Jan. 17, 2024.

EP Searching Authority, Extended Supplemental Search Report and Written Opinion for EP Application No. 24222047.3, dated Apr. 28, 2025, 13 pages.

EP Searching Authority, Extended Supplemental Search Report and Written Opinion for EP Application No. 25151880.9, dated Jun. 3, 2025, 68 pages. Black and Decker Inc., Mar. 6, 2025.

* cited by examiner

490

| Trigger_Detect | GPIO5 | State |
|---|---|---|
| 1 | 0 | No WTC |
| 1 | 1 | W/WTC |
| 0 | 0 | Wait for Start |

FIG. 4C

PORTABLE FLUID TANK SYSTEM WITH MOUNTING ASSEMBLY

RELATED APPLICATIONS

This application is being filed on Jan. 17, 2024, concurrently with the following U.S. Patent Applications, each of which is incorporated by reference herein in its entirety:

| Atty. Docket No. | Patent Application Title | Filing Date |
|---|---|---|
| 1076-0011A2 | PORTABLE FLUID TANK SYSTEM WITH MULTI-STATE CONTROL INTERFACE AND REMOTE OPERATION | Jan. 17, 2024 |
| 1076-0011A3 | PORTABLE FLUID TANK SYSTEM WITH ANGLED SPILL FACE | Jan. 17, 2024 |
| 1076-0011A4 | PORTABLE FLUID TANK SYSTEM WITH DUAL HANDLE | Jan. 17, 2024 |
| 1076-0011A5 | PORTABLE FLUID TANK SYSTEM WITH DIAPHRAGM PUMP | Jan. 17, 2024 |
| 1076-0011A6 | PORTABLE FLUID TANK SYSTEM WITH BIASED COMPARTMENT DOOR | Jan. 17, 2024 |

FIELD

The present disclosure generally relates to portable fluid tank systems.

BACKGROUND

Fluid-based solutions, such as those used in dust suppression during cutting operations of materials like concrete, stone, or ceramics, or for blade cooling, often face challenges due to the lack of convenient and accessible fluid supply at various job sites. Many locations lack established fluid infrastructure, complicating the use of such fluid-based solutions.

SUMMARY

Some embodiments of this disclosure address the above or other challenges by introducing a portable fluid tank system designed for efficient and controlled fluid handling. Such a system can be particularly suited for environments like construction sites, landscaping projects, or remote field operations, where fluid mobility can be beneficial.

Some embodiments of the present disclosure relate to a portable fluid tank system. The portable fluid tank system can include a mounting assembly for secure and adaptable attachment to external docking assemblies. The portable fluid tank system can include a fluid tank with an internal volume for fluid storage and a fluid actuation system for controlled fluid movement and pressurization. An electronics housing within the portable fluid tank system can accommodate a removable energy storage device, providing power to the actuation system. The mounting assembly can include a first engagement member on the fluid tank, configured to mechanically engage with a complementary second engagement member on an external docking assembly. This engagement facilitates the secure attachment of the portable fluid tank system to the docking assembly. The mounting assembly can include a mounting frame, contoured to match the exterior geometry of the fluid tank and extend around its periphery.

Some embodiments of the present disclosure relate to a portable fluid tank system. The portable fluid tank system can include wireless control capabilities. The portable fluid tank system can include a fluid tank with an internal volume for fluid storage and a fluid actuation system for controlled fluid movement and pressurization. An electronics housing within the portable fluid tank system can accommodate a removable energy storage device, providing power to the actuation system. The portable fluid tank system can include a multi-state control interface, facilitating direct user interaction or remote operation via a wireless communication module. The module can receive and execute commands from a remote transmitting device, enabling remote activation and control of the fluid actuation system.

Some embodiments of the present disclosure relate to a portable fluid tank system. The portable fluid tank system can include a fluid tank with an internal volume for fluid storage and a fluid actuation system for controlled fluid movement and pressurization. An electronics housing within the portable fluid tank system can accommodate a removable energy storage device, providing power to the actuation system. The portable fluid tank system can include an integrated spill face that has an annular rim defining an aperture for fluid transfer into or out of the fluid tank. An upper segment of the rim can be elevated and closer to the housing, guiding fluid overflow away from the electronics housing and thus the electronics. A lower segment of the rim can serve as an egress point during overflows.

Some embodiments of the present disclosure relate to a portable fluid tank system. The portable fluid tank system can include a fluid tank with an internal volume for fluid storage and a diaphragm pump for fluid pressurization and conveyance. The diaphragm pump can include a body defining a chamber that is in communication with the internal volume of the fluid tank, and a flexible diaphragm for pressure modulation. The portable fluid tank system can include an electronics housing to accommodate a removable energy storage device for providing power to the diaphragm pump.

Some embodiments of the present disclosure relate to a portable fluid tank system. The portable fluid tank system can include a fluid tank with an internal volume for fluid storage and a fluid actuation system for controlled fluid movement and pressurization. An electronics housing within the portable fluid tank system can accommodate a removable energy storage device, providing power to the actuation system. The portable fluid tank system can include a multi-handle structure, with a first handle positioned proximate a top portion of the system and a second handle positioned proximate a side portion of the fluid tank.

Some embodiments of the present disclosure relate to a portable fluid tank system. The portable fluid tank system can include a fluid tank with an internal volume for fluid storage and a fluid actuation system for controlled fluid movement and pressurization. An electronics housing within the portable fluid tank system can accommodate a removable energy storage device, providing power to the actuation system. The portable fluid tank system can include a battery compartment housing suitable for holding a removable energy storage device. The housing can define an opening for inserting the removable energy storage device therein. A battery compartment cover, capable of removably sealing the opening, can be pivotably joined to the housing by a biasing element. The biasing element can apply a force that biases the cover towards a closed position. To open the cover, a user can exert effort against the biasing force. Once released, the cover can automatically return to the closed position due to the biasing element.

BRIEF DESCRIPTION OF THE DRAWINGS

Throughout the drawings, reference numbers can be re-used to indicate correspondence between referenced elements. The drawings are provided to illustrate embodiments of the present disclosure and do not to limit the scope thereof.

FIG. 4C shows an example logic state table for the control system of the portable fluid tank system in FIG. 4B.

DETAILED DESCRIPTION

Figure 1A:
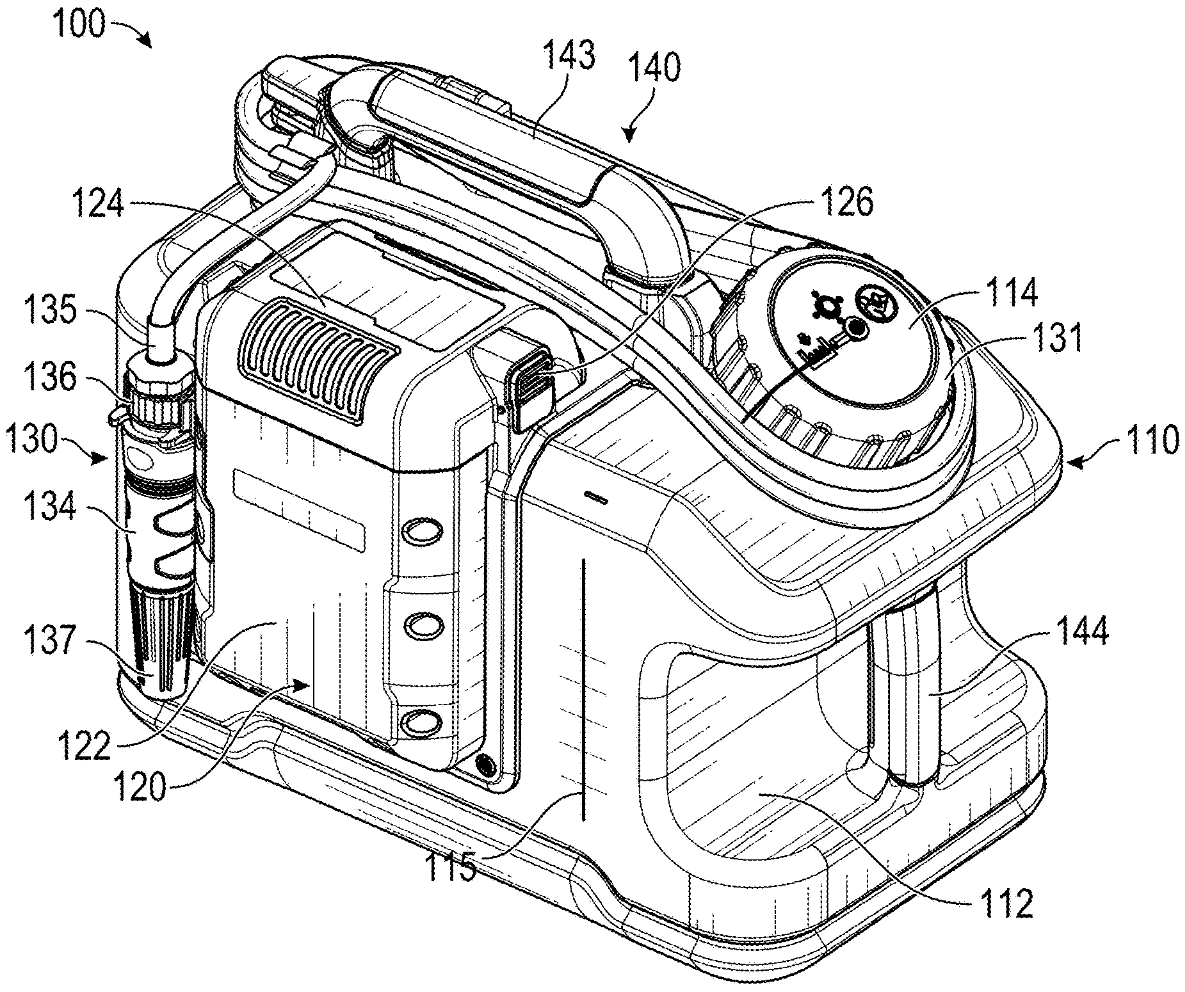
FIG. 1A illustrates a first side perspective view of a portable fluid tank system in accordance with the present disclosure.
Figure 1B:
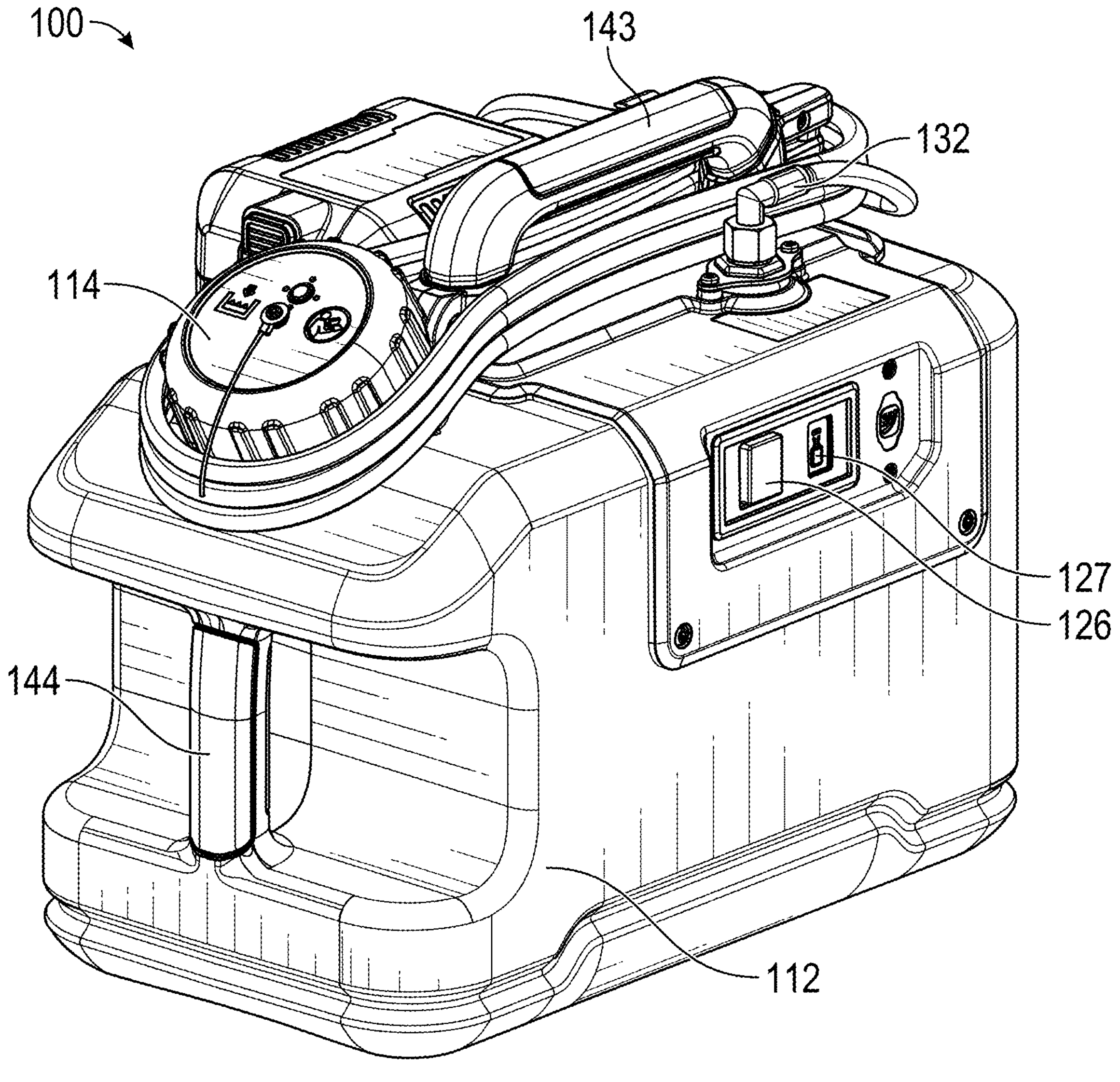
FIG. 1B illustrates a second side perspective view of the portable fluid tank system of FIG. 1A.
Figure 1C:
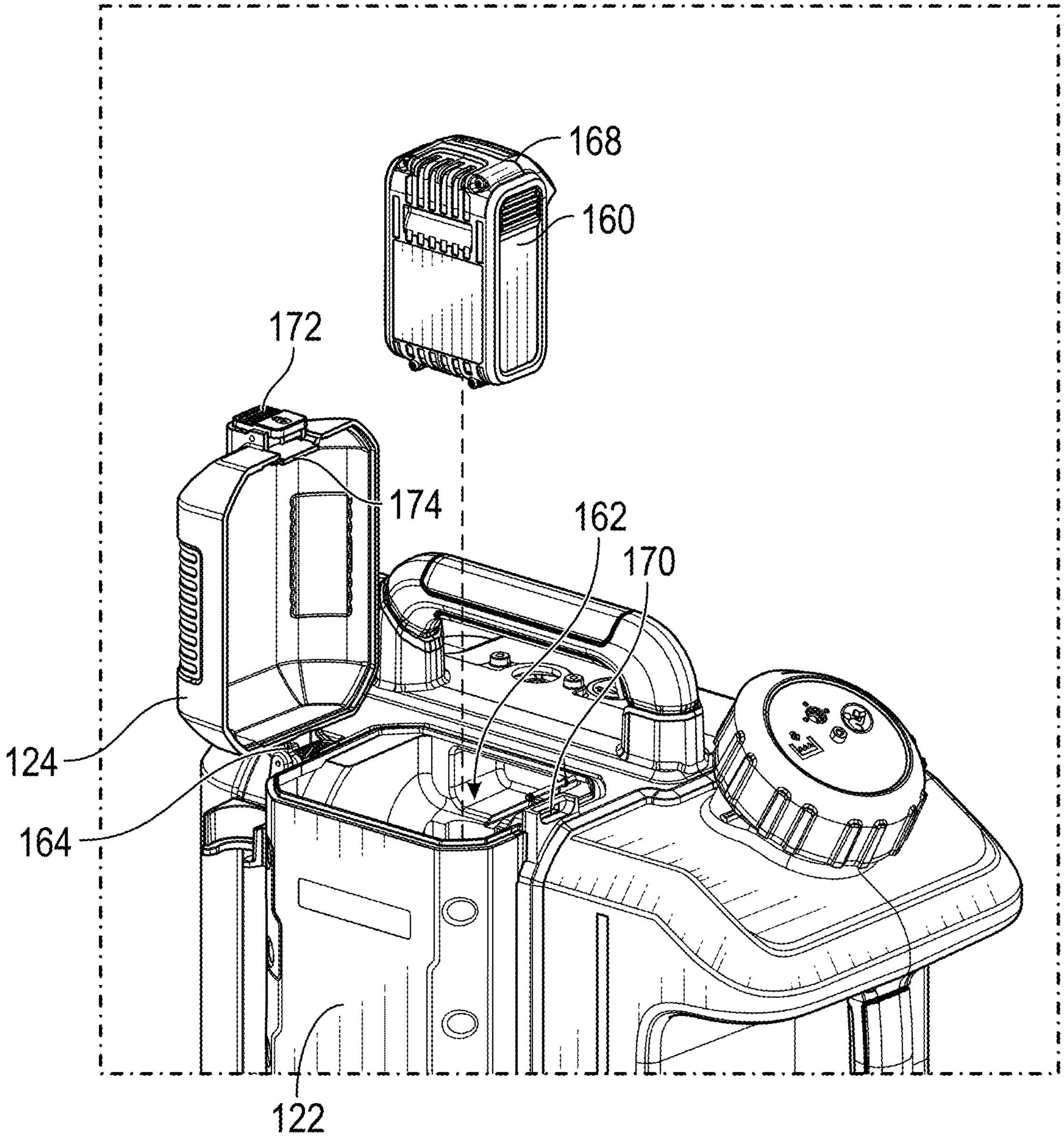
FIG. 1C illustrates a detailed view of the portable fluid tank system of FIG. 1A, showing a battery compartment in an open state and a battery aligned for insertion into the battery compartment.

FIGS. 1A and 1B illustrate first and second side perspective views of a portable fluid tank system 100 in accordance with the present disclosure. FIG. 1C illustrates a detailed view of the portable fluid tank system of FIG. 1A, showing a battery compartment cover 124 in an open state and a battery 160 aligned for insertion into a battery compartment housing 122 (sometimes referred to as electronics housing). It will be appreciated that the portable fluid tank system 100 may be an embodiment of any of the portable fluid tank systems 200, 400, 500, 600, or 800 as described herein and illustrated in FIG. 2A-2E, 4A-4C, 5A-5B, 6, or 8A-8D, respectively.

Referring to FIGS. 1A-1C, the portable fluid tank system 100 includes a tank assembly 110, an electronics housing assembly 120, a fluid actuation system 130, and a storage and handling assembly 140. The tank assembly 110 can include a fluid tank 112 and a tank cap 114. The fluid tank 112 can include an internal volume for holding fluid, such as various liquids, including water, chemicals, fuels, or other substances. The tank cap 114 can removably interface with a complementary opening of the fluid tank 112. In some instances, the tank cap 114 can be securely fastened to the complementary opening, establishing a secure and/or airtight seal. Such as design can reduce the likelihood of leakage and can facilitate the containment of liquid within the fluid tank 112.

The capacity of the fluid tank 112 can vary across embodiments. For example, the fluid tank 112 may have a capacity of about 2, 3, 4, 5, 6, 8, or 10 gallons. As another example, the fluid tank 112 may have a capacity of more than about 0.5, 1, 1.5, 2, 2.5, 3, or 3.5 gallons and/or than less than about 5, 6, 8, 10, 15, or 20 gallons. As another example, the fluid tank 112 may have a capacity of about 2-10 gallons, 4-8 gallons, 6-12 gallons, 10-15 gallons, or 10-20 gallons.

The dimensions of the fluid tank 112 can vary across embodiments, such as to accommodate different spatial constraints and usage scenarios. For example, the fluid tank 112 may have dimensions (L×W×H) measuring about 409×209×330 mm. As another example, the fluid tank 112 may have length (L) dimensions ranging from about 300 mm to 700 mm, width (W) dimensions ranging from about 100 mm to 500 mm, or height (H) dimensions ranging from about 200 mm to 600 mm. In some cases, the size and/or capacity of the fluid tank 112 is selected based on a balance between fluid storage and the practicalities of portability and usability in a range of operational settings. As a nonlimited example, the fluid tank 112 can be sized in such a manner that, when filled to capacity, it remains portable, such as allowing manual transport by an average adult, or by a few people. This weight may be less than X pounds, with values of X being about 30, 50, 70, 90, 100, 120, 150, or 200 pounds.

The fluid tank 112 can include calibrated measurement lines 115 to accurately indicate fluid levels within the fluid tank 112. The measurement lines 115 can provide a visual indicator of the fluid level within the fluid tank 112. It will be appreciated that the calibrated measurement lines 115 can be configured for various measurement systems, including metric or imperial units.

The electronics housing assembly 120 can include a battery compartment housing 122 and/or a housing for other electronics, such as a multi-state control interface 126, a communication module (see e.g., the communication module 410 of FIG. 4A), a pairing button 127, or the like. The battery compartment housing 122 can hold a battery 160, thereby facilitating power distribution to the portable fluid tank system 100, such as to the fluid actuation system 130 and/or other electronics of the portable fluid tank system 100. The electronics housing assembly 120 includes a battery compartment housing 122 defining a cavity 162 sized to receive the battery 160, and a battery compartment cover 124. In the illustrated example, the battery compartment cover 124 is coupled to the battery compartment housing 122 using a hinge 164. In some cases, the hinge 164 is biased to impart a closing force on the battery compartment cover 124, thereby automatically transitioning the battery compartment cover 124 into a closed position over the battery compartment housing 122. Furthermore, the electronics housing assembly 120 can include a latch assembly 170 that can secure the battery compartment cover 124 in the closed position. In some cases, the electronics housing assembly 120 includes a battery compartment release button 172. In some such cases, when activated (e.g., pressed), the battery compartment release button 172 disengages the latch assembly 170 from the complementary latch assembly 174 of the battery compartment housing 122, thereby allowing the battery compartment cover 124 to be opened from its closed position. Additionally, the battery 160 can include a release button 168, which can facilitate the easy insertion and removal of the battery 160 into and from the battery compartment housing 122.

As mentioned, the electronics housing assembly 120 can house various system components, including, but not limited to, the battery compartment housing 122, a multi-state control interface 126 (such as a three-position switch), a pairing button 127, or related electronics. In some cases, the battery compartment housing 122 may be separate from another electronics housing that houses the multi-state control interface 126 and the pairing button 127. In some cases, some, most, or all of the electronics of the portable fluid tank system 100 are grouped together or positioned proximate each other within the portable fluid tank system 100, which can increase a likelihood of safeguarding them from potential fluid overflows. As shown the placement of the electronics housing assembly 120 can be generally centralized and positioned near a top portion of the portable fluid tank system 100.

The fluid actuation system 130 can facilitate controlled movement and/or pressurization of the fluid in the fluid tank 112 for ejection through a conduit, such as the hose 131. The fluid actuation system 130 can include a hose 131, a hose connector 132 attached to the hose 131 and configured to serve as the interface for connecting the hose 131 to the fluid tank 112. The fluid actuation system 130 can include a nozzle 134, affixed to the hose 131 via a nozzle connector 135, which can allow for controlled dispersion of the fluid from the portable fluid tank system 100. The fluid actuation system 130 can include a nozzle holder 136 that provides a secure storage point for the nozzle 134 when not in use. A fluid pressure adjustment collar 137 can enable a user to modify the fluid pressure as desired.

The fluid actuation system 130 can include a pump (see e.g., the diaphragm pump 700 of FIG. 7A), such as a centrifugal pump, positive displacement pump (including piston, diaphragm, and gear pumps), diaphragm pump, peristaltic pump, gear pump, vane pump, screw pump, axial piston pump, jet pump, or air-operated diaphragm pump (AODD). In some cases, the pump is implemented as a diaphragm pump configured to oscillate a flexible diaphragm to variably alter the internal volume, thereby facilitating the intake, pressurization, and/or ejection of the fluid through the conduit.

The storage and handling assembly 140 can include at least two handles, such as a first handle 143 and a second handle 144. The first handle 143 is coupled to the top surface of the fluid tank 112, while the second handle 144 is on a side surface. The first and second handles 143, 144 can facilitate lifting and/or handling the portable fluid tank system 100. The first handle 143 can be oriented approximately orthogonally to the second handle 144, for example to facilitate an ergonomic grip. In some cases, the first handle 143 and the second handle 144 are seamlessly integrated into the structure of the fluid tank 112 structure, without joints or seams. In some such cases, the first handle 143 and/or the second handle 144 may include a hollow portion that contributes to the internal volume of the fluid tank. The first handle 143 can be strategically located proximate to the top surface of the fluid tank 112 to enable vertical maneuverability. Complementing this, the second handle 144 is located proximate a side surface of the fluid tank. This second handle 144 can be positioned at an approximate 90-degree angle relative to the first handle 143, offering a lateral handling capability.

Example Mounting Frame and Assembly

Figure 2A:
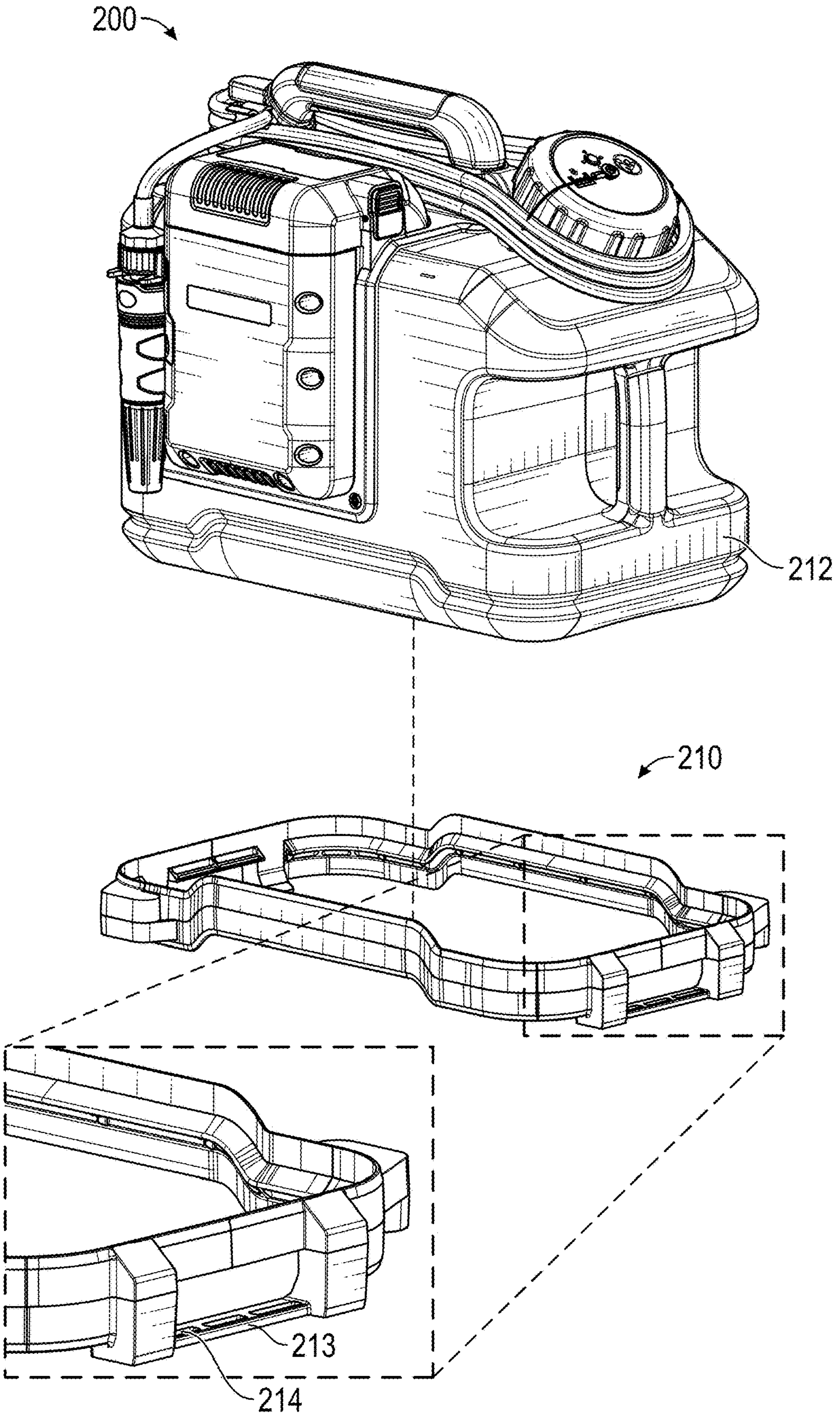
FIG. 2A illustrates an exploded view of an example portable fluid tank system, showing a mounting frame separate from the fluid tank, and a sectional enlargement of a side latch engaging structure of the mounting frame.

FIG. 2A illustrates an exploded view of an example portable fluid tank system 200, showing a mounting frame 210 separate from the fluid tank 212, and a sectional enlargement of a mounting assembly (sometimes referred to as a side latch engaging structure 213) of the mounting frame 210. It will be appreciated that the portable fluid tank system 200 may be an embodiment of any of the portable fluid tank systems 100, 400, 500, 600, or 800 as described herein and illustrated in FIG. 1A-1C, 4A-4C, 5A-5B, 6, or 8A-8D, respectively.

The mounting frame 210 can be configured to removably couple to a lower exterior of the fluid tank 212. In some cases, the mounting frame 210 is a chassis-like structure. For example, the mounting frame 210 can be contoured to correspond with the external geometry of the fluid tank 212, facilitating an interlocking and snug engagement. As shown, in some cases, the mounting frame 210 can extend around the periphery, following the external contours of the fluid tank 212 to provide a congruent and stabilized mounting configuration. In some cases, the mounting frame 210 and/or the side latch engaging structure 213 may be incorporated into the structure of the portable fluid tank system 200, such as through a blow-molding process. Further still, in some cases, the mounting frame 210 and/or the side latch engaging structure 213 may be implemented as multiple separate mounting attachments that individually attach to the portable fluid tank system 200. Alternatively, the side latch engaging structures 213 may be individually affixed to the portable fluid tank system 200, without a separate mounting frame 210.

In some cases, the mounting frame 210 enables cross-platform compatibility with an external docking assembly of various systems. For example, the mounting frame 210 can be dimensioned and contoured to be compatible with existing storage solutions, such as, but not limited to, systems akin to TSTAK® or STANLEY® PROSTACK™ units, thus facilitating a more universal application. The design and placement of the side latch engaging structure 213 can vary across embodiments.

Figure 2B:
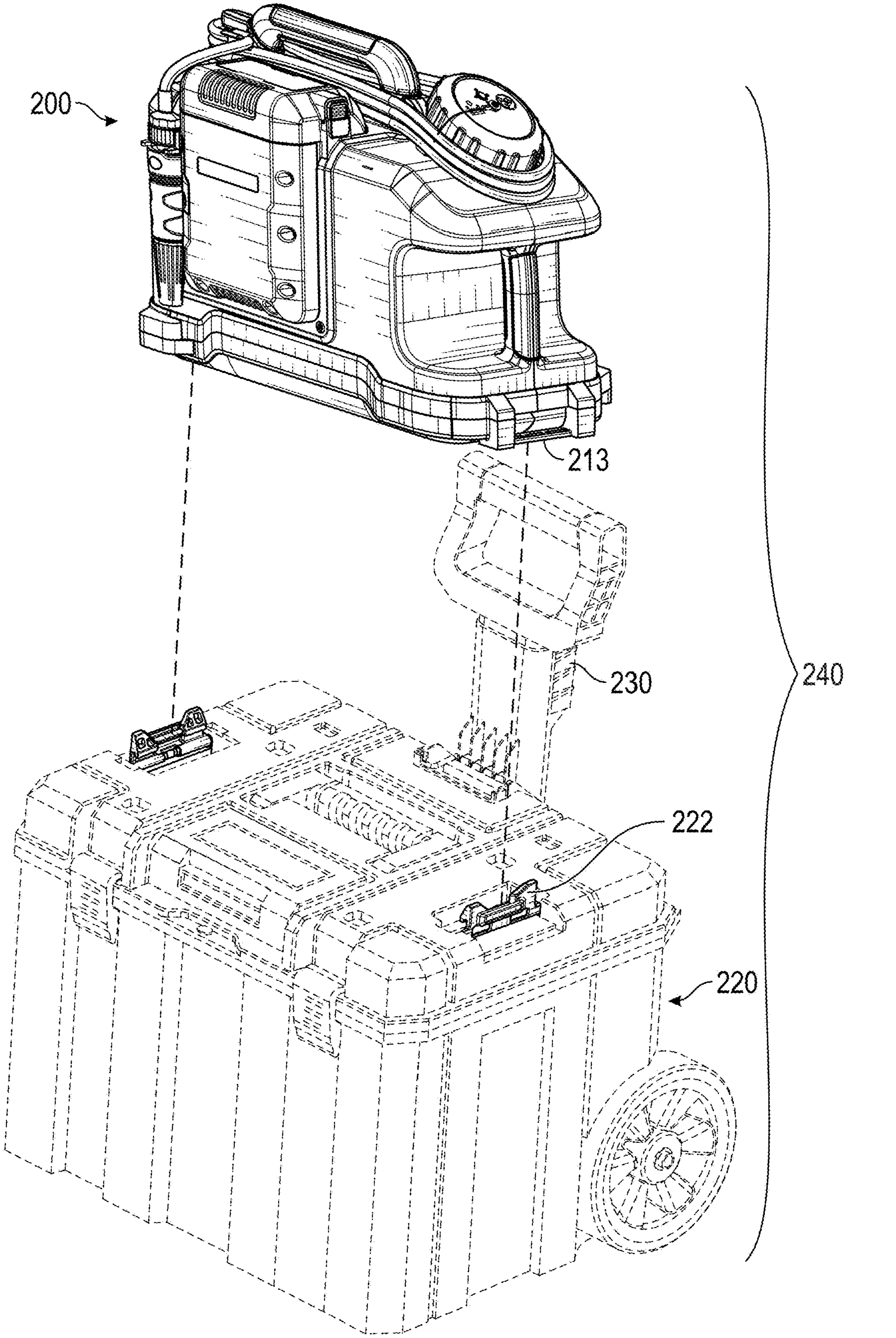
FIG. 2B illustrates an exploded view of an example fluid transport and storage assembly, showing the portable fluid tank system of FIG. 2A separate from a container module on a trolley.
Figure 2C:
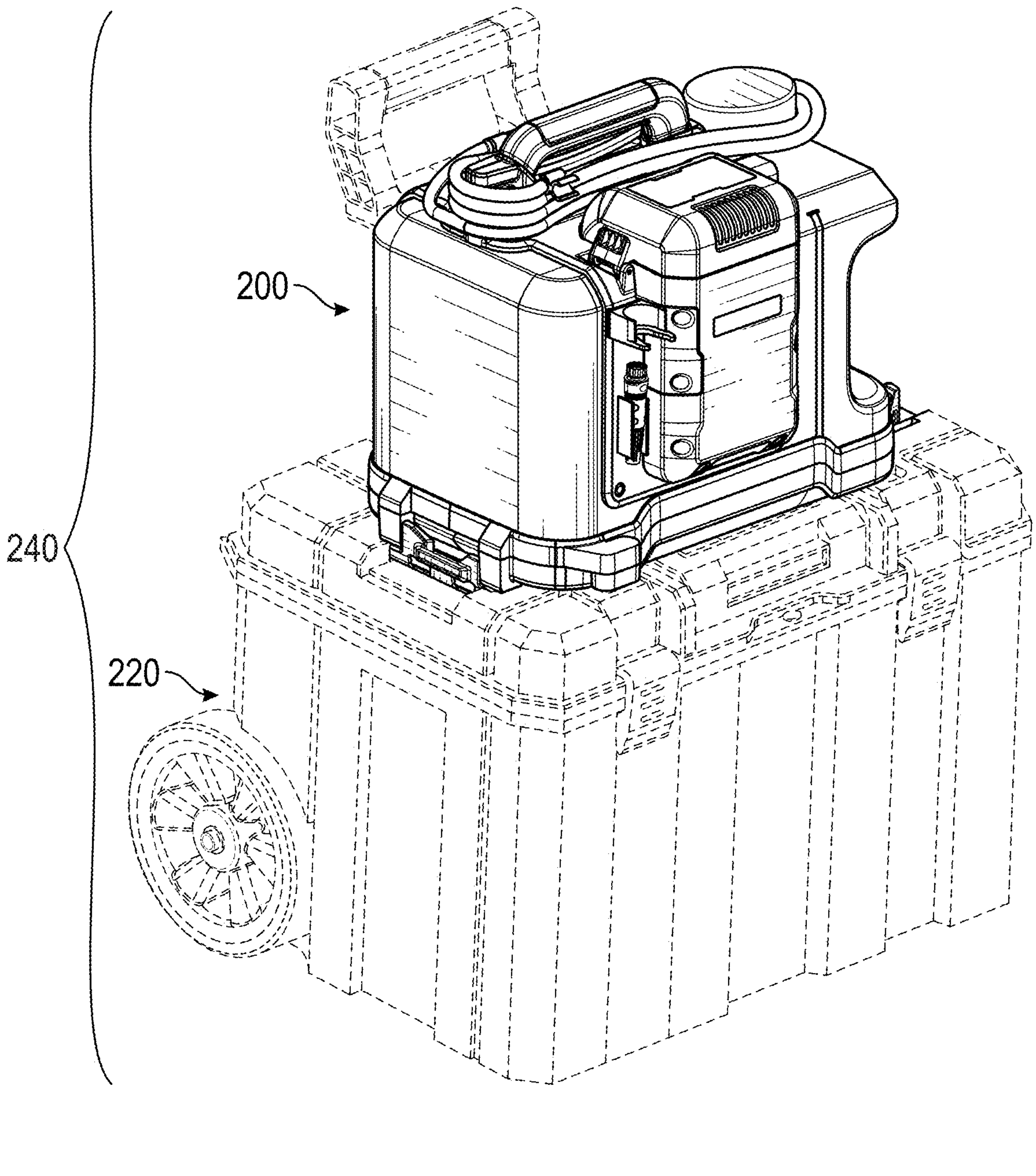
FIG. 2C illustrates the fluid transport and storage assembly of FIG. 2B.
Figure 2D:
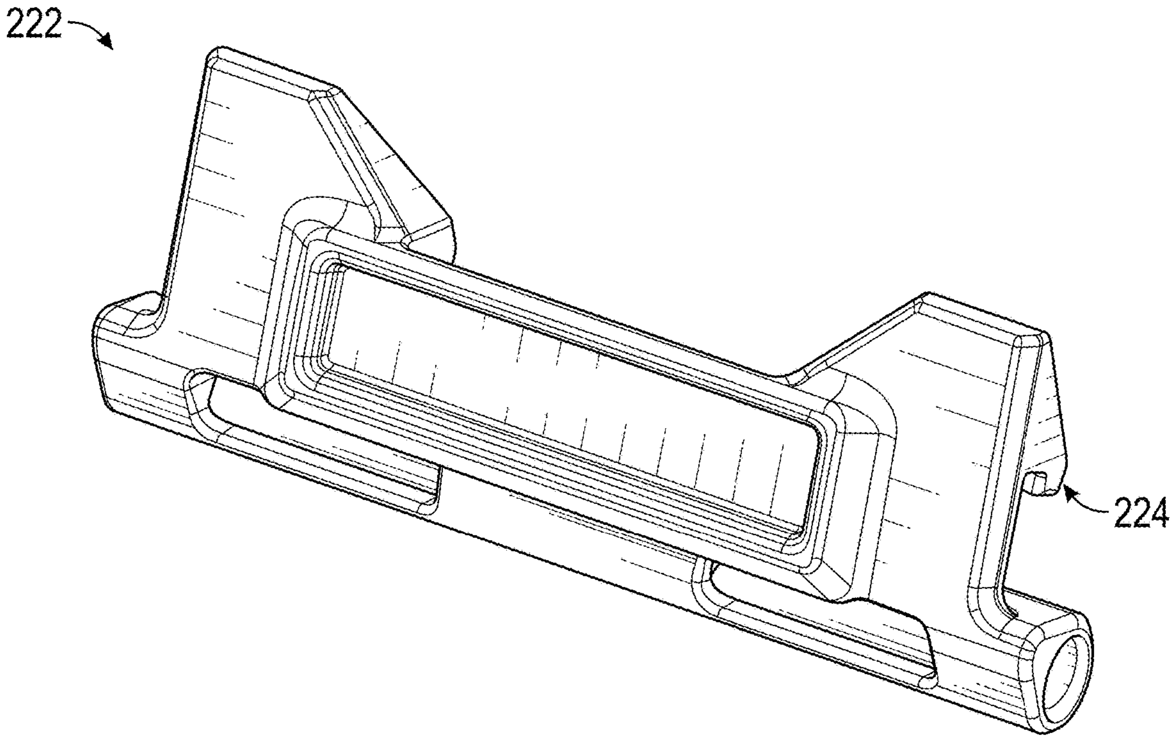
FIGS. 2D and 2E illustrate front and rear perspective views, respectively, of the side latch of FIGS. 2B and 2C.
Figure 2E:
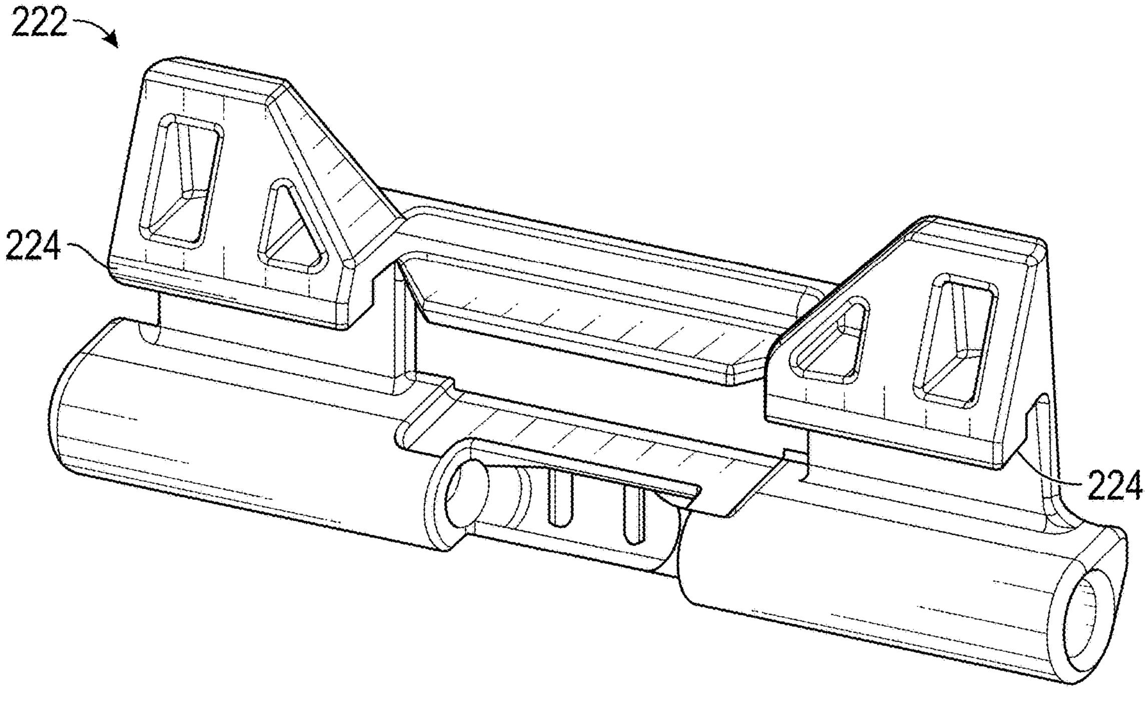

FIG. 2B illustrates an exploded view of an example fluid transport and storage assembly 240, showing the portable fluid tank system 200 of FIG. 2A separate from a container module 220 on a trolley 230. FIG. 2C illustrates the fluid transport and storage assembly 240 of FIG. 2B. FIGS. 2D and 2E illustrate front and rear perspective views, respectively, of the side latch of FIGS. 2B and 2C.

Referring to FIGS. 2A-2E, the container module 220 may include a pair of side latches 222 and the mounting frame 210 may include a pair of side latch engaging structures 213 that have substantially the same structure and function to the latches 28 and latch engaging structures 31 on the container modules 70, 72, 74 disclosed in U.S. Pat. No. 8,657,307, which is incorporated by reference herein. Each side latch 222 includes an upper engaging member 224 (e.g., one or more protrusions) constructed and arranged to engage with the side latch engaging structure 213 (e.g., one or more slots 214) of the mounting frame 210 so as to non-releasably connect the mounting frame 210 (and thus the portable fluid tank system 200) to the container module 220 (or another container module having the pair of side latches 222). In some embodiments, the upper engaging member 224 may be curved or bent inwardly or at an angle relative to the rest of the side latch 222, such that the upper engaging member 224 may be received in the side latch engaging structure 213 during the releasable connection. In some embodiments, the container module 220 and/or the mounting frame 210 may be a storage container module and mounting frame sold under the registered trademark TSTAK® by DEWALT Industrial Tool Co. of Towson, Md., and each side latch 222 and side latch engaging structure 213 may be substantially the same as the latches and latch engaging structures on the TSTAK® container modules.

Referring to FIGS. 2A-2E, the mounting frame 210 is shown with two side latch engaging structures 213, located on opposing lateral sides relative to a central axis of the portable fluid tank system 200. However, the quantity of side latch engaging structures 213 can vary across embodiments. For example, the mounting frame 210 can include one, two, three, four, or more side latch engaging structures 213. Furthermore, the spatial arrangement of the side latch engaging structures 213 may vary across embodiments. For example, FIGS. 2A-2E show two side latch engaging structures 213 on lateral sides, alternative configurations may place the side latch engaging structure 213 on any side of the portable fluid tank system 200, including, but not limited to, positions on adjacent sides of the portable fluid tank system 200.

Although the side latch engaging structures 213 are described collectively, it will be appreciated that each side latch engaging structure 213 may be different from another side latch engaging structure 213. For example, one side latch engaging structure 213 may be a mirror image of another side latch engaging structure 213. In addition to alternatively, two side latch engaging structures 213 on the mounting frame 210 may include different engagement interfaces.

It will be appreciated that the side latch engaging structure 213 of the mounting frame 210 may vary across embodiments. For example, the side latch engaging structure 213 and the side latch 222 can include any corresponding coupling features. As non-limiting examples, the side latch engaging structure 213 include one or more slots, recesses, grooves, protrusions, detents, tabs, magnetic, snap-fit, screw-fit, or other releasable fastening methods, designed to intermesh with a compatible coupling structure of the side latch 222.

Figure 3C:
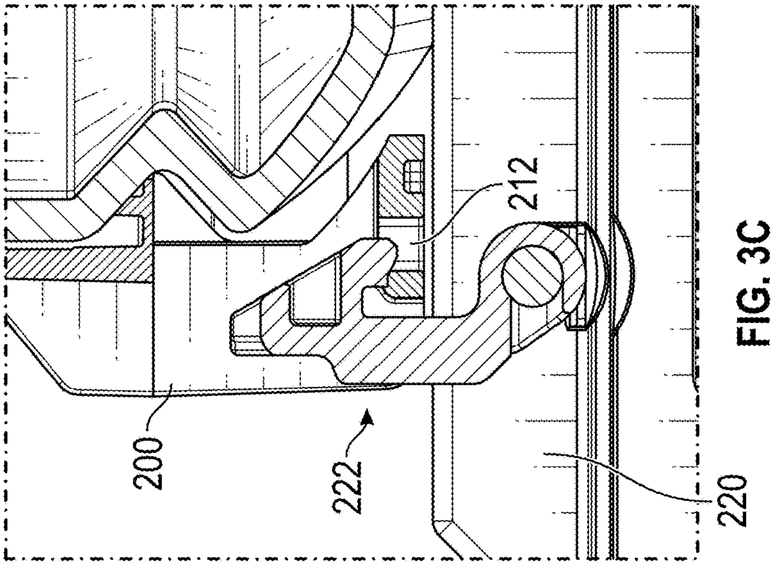
FIGS. 3A-3C illustrate a transitional sequence of an example engagement process of a side latch with a complementary side latch engaging structure of a portable fluid tank system.
Figure 3B:
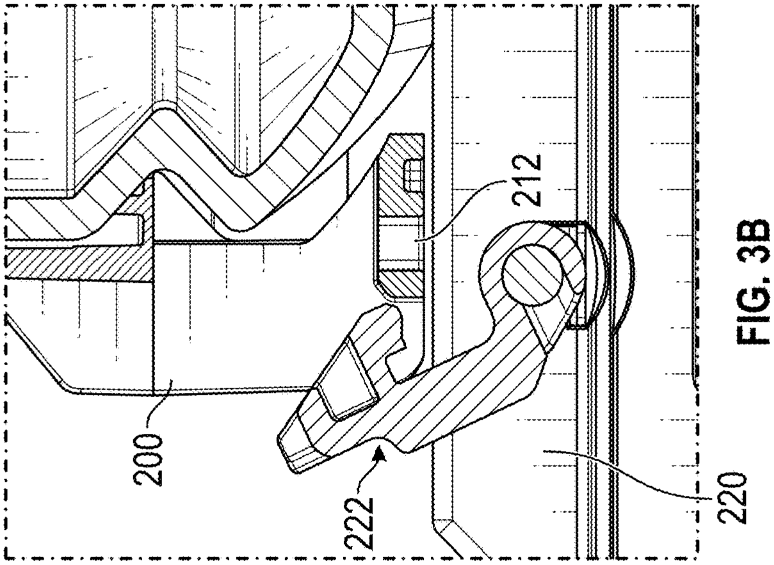
Figure 3A:
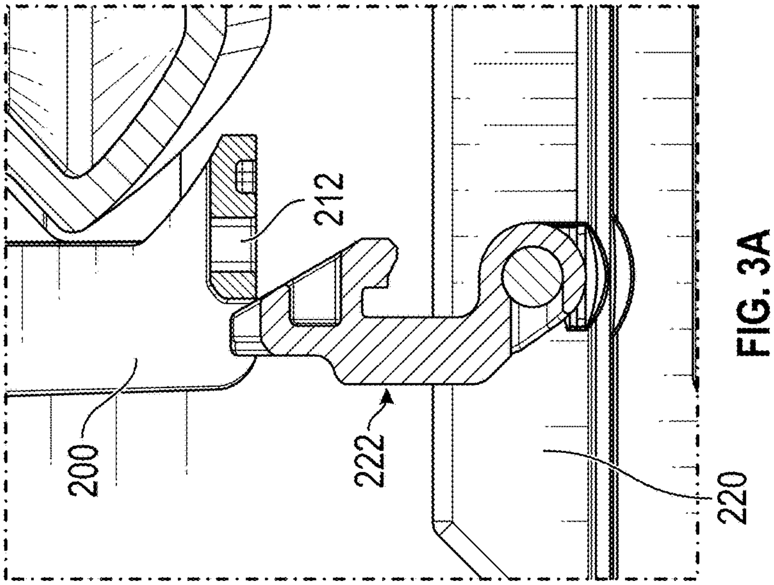

FIGS. 3A-3C illustrates a transitional sequence demonstrating the engagement of the side latch 222 of the container module 220 with the complementary side latch engaging structure 213 of the portable fluid tank system 200 of FIGS. 2A-2E.

FIG. 3A illustrates the portable fluid tank system 200 in a position above a container module 220. Here, the side latch 222 is depicted in a pre-engagement stance, maintained in a vertical orientation awaiting interaction. The vertical orientation of the side latch 222 may be maintained through a biasing element, such as a spring, which can apply a biasing force to retain and/or return the side latch 222 to its upright position.

In FIG. 3B, the portable fluid tank system 200 is being lowered towards the container module 220, initiating contact between the side latch 222 and the side latch engaging structure 213. Upon this interaction, the side latch 222 is biased outward due to the contact, prompting it to pivot about a latch axis.

FIG. 3C illustrates the result of the engagement process, where the portable fluid tank system 200 is fully seated onto the container module 220. The side latch 222, having pivoted during engagement, reverts to its original orientation, thereby locking into place with the side latch engaging structure 213, signifying a secure attachment.

The transitional sequence of FIGS. 3A-3C demonstrates an example mechanical interaction where the physical manipulation of the portable fluid tank system 200 relative to the container module 220 results in a secure engagement via the interlocking of complementary latch components.

Example Wireless Communication Module

Figure 4A:
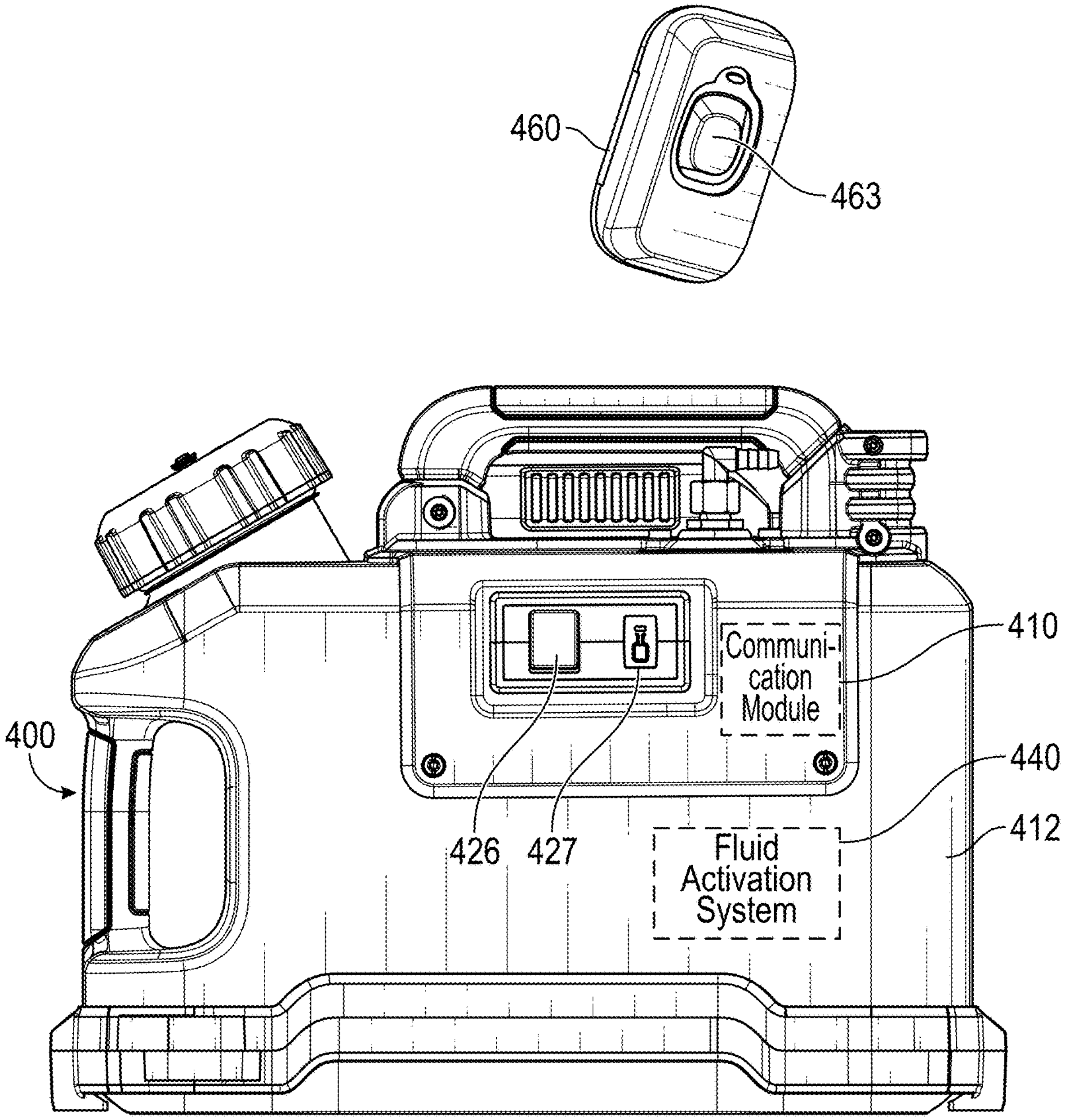
FIG. 4A illustrates an example portable fluid tank system with an integrated communication module and an associated remote transmitting device.

FIG. 4A illustrates an example portable fluid tank system 400 with an integrated communication module 410 and an associated remote transmitting device 460. It will be appreciated that the portable fluid tank system 400 may be an embodiment of any of the portable fluid tank systems 100, 200, 500, 600, or 800 as described herein and illustrated in FIG. 1A-1C, 2A-2E, 5A-5B, 6, or 8A-8D, respectively. The portable fluid tank system 400 can include a fluid actuation system 440, a multi-state control interface 426, a communication module 410, and a pairing button 427.

The multi-state control interface 426 can provide a user with the capability to select and change operational modes of the fluid actuation system 440. This may include, for example, switching between modes such as manual operation, where a user directly controls the fluid actuation system 440, and a wireless control mode, where the portable fluid tank system 400 is controlled remotely via the remote transmitting device 460. The multi-state control interface 426 can be positioned on an exterior of the portable fluid tank system 400.

In some configurations, the multi-state control interface 426 is implemented as a three-position switch, enabling selection among different operational states. A first position of the switch can serve as an 'Off' mode, powering down the fluid actuation system 440 and/or the portable fluid tank system 400. In some cases, while the switch is in the first position, the fluid actuation system 440 and/or the portable fluid tank system 400 remain inactive. A second position can be an 'On' mode, which powers on the fluid actuation system 440 and/or the portable fluid tank system 400. A third position can activate a 'Wireless Control' mode, where the switch enables remote control of the fluid actuation system 440 via a remote transmitting device 460. Such a configuration of the multi-state control interface 426 with distinct switch positions can provide a straightforward approach for users to efficiently control the operational state of the portable fluid tank system 400.

The 'Off' and 'On' positions can allow a user to manually activate and manage the fluid actuation system 440. For example, the direct control mode can facilitate hands-on engagement with the portable fluid tank system 400, enabling a user to activate the fluid actuation system 440 and/or manipulate aspects such as power status, flow rate, or pressure through direct interaction with the multi-state control interface 426.

The wireless control mode can provide the capability for remote operation of the fluid actuation system 440. For example, the wireless control mode can allow a user to activate, adjust, or deactivate the fluid actuation system 440 and/or the portable fluid tank system 400 remotely through the remote transmitting device 460. In this way, the wireless control mode can facilitate operational flexibility, facilitating control over parameters such as, but not limited to, power status, flow rate, or pressure, all from a distance, bypassing the need for direct physical interaction with the multi-state control interface 426. The wireless control mode may be advantageous in various scenarios, such as where direct access to the system is impractical or unsafe, or accessibility is limited, or where maintaining a safe distance from the system is desirable. Thus, the wireless control mode can offer the convenience of turning on or off the fluid actuation system 440, or other components of the portable fluid tank system 400, remotely.

The wireless control mode of the portable fluid tank system 400 can be facilitated by the communication module 410, which can be configured to interact with one or more remote transmitting devices 460. For example, the communication module 410 can be equipped with hardware and software capabilities to receive, decode, or process wireless signals from a remote transmitting device 460. These signals can include commands for activation, deactivation, and adjustment of operational parameters of the fluid actuation system 440 or other components of the portable fluid tank system 400. The communication module 410 may incorporate wireless communication technologies, such as, but not limited to, Bluetooth, Wi-Fi, or RF (Radio Frequency) modules, to facilitate reliable and/or secure transmission of signals over varying distances.

In some cases, the portable fluid tank system 400 can be controlled concurrently either via manual operation or wirelessly through the remote transmitting device 460. In other cases, control of the portable fluid tank system 400 through the remote transmitting device 460 can only be enabled when the wireless control mode is actively engaged. In some such cases, when not in wireless control mode, the portable fluid tank system 400 may default to direct control mode, allowing a user to manually activate and manage the fluid actuation system 440.

Although illustrated as a three-position switch, the implementation of the multi-state control interface 426 can vary across embodiments. For example, the multi-state control interface 426 can incorporate touch-sensitive controls or sliders. In addition or alternatively, the multi-state control interface 426 can include an LED indicator or a small display screen, providing visual feedback regarding the current operational state of the system or diagnostic information about the portable fluid tank system 400. In some embodiments, the multi-state control interface 426 can be integrated with a programmable logic controller (PLC), for example to enable automation of certain functions based on pre-set conditions or user-defined programs.

The pairing button 427 on the portable fluid tank system 400 can be utilized to initiate a pairing process with a remote transmitting device 460. When pressed, the pairing button 427 can activate a wireless communication function, signaling the communication module 410 to enter a pairing state. This action can prepare the portable fluid tank system 400 to establish a wireless connection with the remote transmitting device 460, which might also require a corresponding pairing action on the remote transmitting device 460. The pairing button 427 can provide a simple and effective means for synchronizing the portable fluid tank system 400 with the remote transmitting device 460, enabling wireless communication and control capabilities.

The remote transmitting device 460 can be a handheld unit configured to wirelessly transmit command signals to a portable fluid tank system, such a via button 463. The remote transmitting device 460 can include a communication module for sending signals and/or a pairing mechanism to facilitate the establishment of a wireless connection with the portable fluid tank system 400. In some cases, a remote transmitting device 460 can be incorporated into power tools, such as those provided by the same supplier as the portable fluid tank system 400, allowing for an integrated control experience across multiple tools and devices.

Consider a scenario where the portable fluid tank system 400 can be operated remotely with a remote transmitting device 460. To enable remote control, a user can press the pairing button 427 on the portable fluid tank system. Concurrently, the user can activate a similar pairing function on the remote transmitting device 460. This process can establish a wireless connection between the communication module 410 of the portable fluid tank system and the remote transmitting device 460. Once paired, the user can switch activate the wireless control mode using the multi-state control interface 426. In this mode, commands can be sent remotely from the remote transmitting device 460 to control the fluid actuation system 440, allowing adjustments to operating parameters like power status, flow rate, or pressure.

Figure 4B:
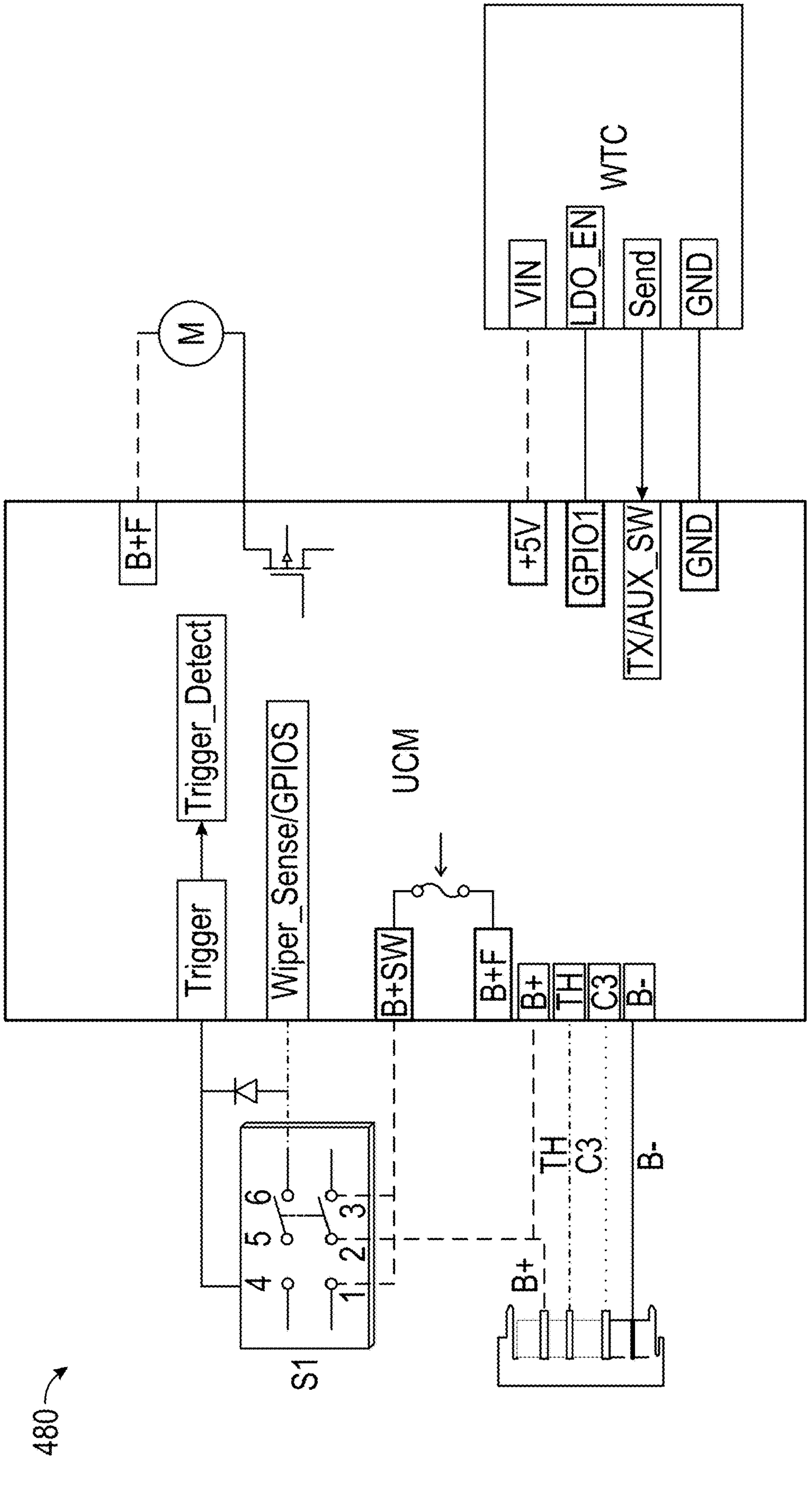
FIG. 4B illustrates an example schematic diagram of a control and communication circuit for the portable fluid tank system in FIG. 4A.

FIG. 4B illustrates an example schematic diagram 480 of a control and communication circuit for the portable fluid tank system 400 in FIG. 4A. Referring to FIGS. 4A and 4B, the communication circuit includes a user control module (UCM) interfaced with a multi-state control switch (S1), which can be set to various positions to control the operational state of the system. The UCM can be connected to a communication module that can wirelessly receive command signals from the remote transmitting device 460, equipped with a button 463 for sending such commands. The diagram indicates a trigger mechanism that, when activated, signals the presence of a command-such as toggling the fluid actuation system 440 between active and inactive states.

The UCM is linked to a battery supply (B+), grounding (B−), and other control elements, like a throttle control (TH) and wiper sense or general-purpose input/output ports (Wiper_Sense/GPIOS). In some such cases, the system is configured to monitor and adjust power supply and actuation based on user inputs from both the interface of the portable fluid tank system 400 and the remote transmitting device 460.

FIG. 4C shows an example logic state table 490 for a control system of a portable fluid tank system, specifically detailing operational states as determined by input signals. The 'Trigger_Detect' signal and 'GPIO5' input can dictate the system's condition. A 'Trigger_Detect' value of '1' combined with a 'GPIO5' value of '0' can indicate that the wireless tool connection (WTC) is not engaged. When both 'Trigger_Detect' and 'GPIO5' are '1', the system can recognize that the WTC is active and operational. If both values are '0', the system can remain in a standby mode, awaiting a start command.

Example Spill Face

Figure 5A:
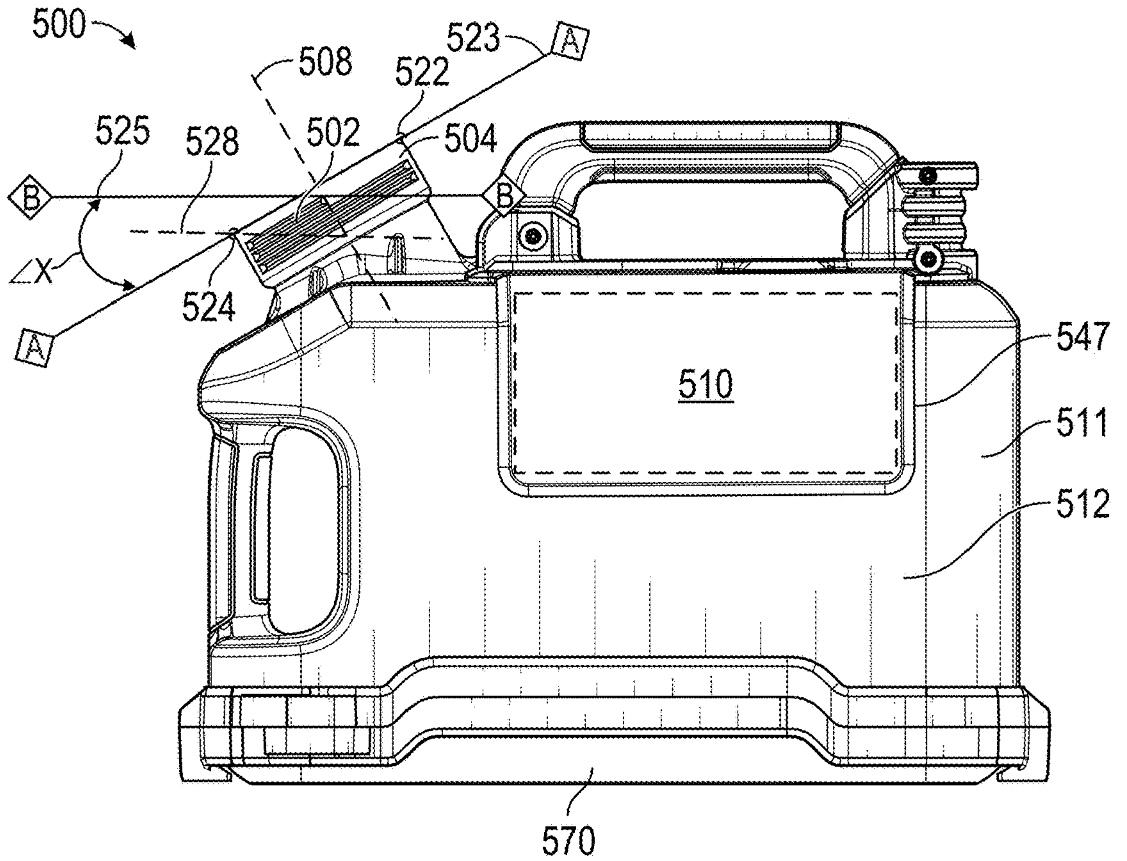
FIG. 5A illustrates a side view of an example portable fluid tank system.
Figure 5B:
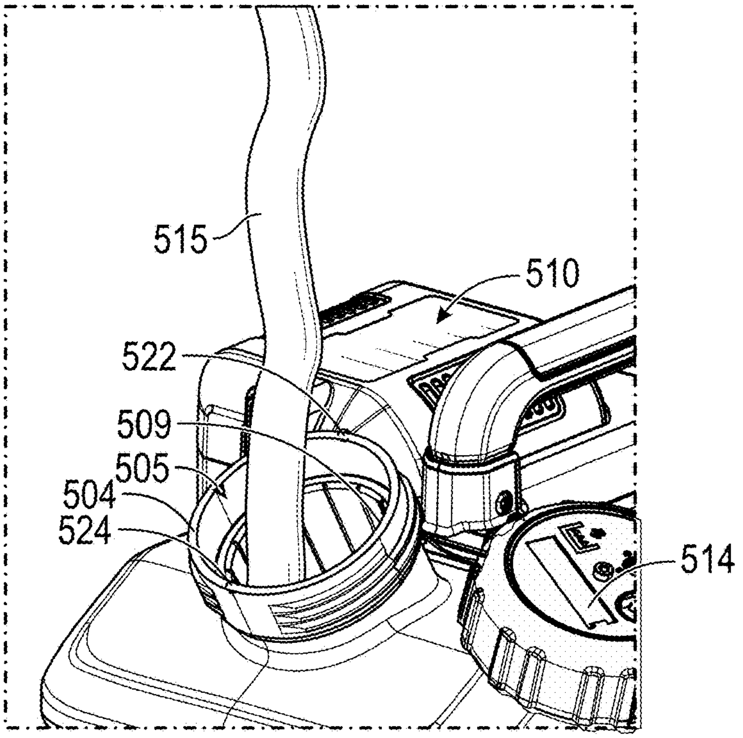
FIG. 5B shows a detailed perspective of the portable fluid tank system of FIG. 5A, focusing on a fluid pathway where fluid enters the tank through an aperture defined by a spill face.

FIG. 5A illustrates a side view of an example portable fluid tank system 500, which may be an embodiment of the portable fluid tank system 100 of FIGS. 1A-1C. FIG. 5B illustrates an environmental view of the portable fluid tank system 500, showing fluid 515 entering a fluid tank 512 through an aperture 505 defined by a spill face 504. It will be appreciated that the portable fluid tank system 500 may be an embodiment of any of the portable fluid tank systems 100, 200, 400, 600, or 800 as described herein and illustrated in FIG. 1A-1C, 2A-2E, 4A-4C, 6, or 8A-8D, respectively.

Referring to FIGS. 5A and 5B, the portable fluid tank system 500 includes the fluid tank 512 defining an internal volume for holding fluid 515, a housing 511 defining a cavity 547 to accommodate electronic components 510, and a spill face 504. The spill face 504 defines an aperture 505 for allowing for fluid ingress into or egress from the fluid tank 512.

The portable fluid tank system 500 can include a filler neck 502, which can be a funnel-like structure that serves as an alignment guide for fluid transfer operations into or out of the fluid tank 512, as well as a barrier against fluid ingress toward the housing 511. As shown, the filler neck 502 can terminate in the spill face 504. In some cases, the filler neck 502 may be contiguous with the spill face 504 and/or the fluid tank 512. The filler neck 502 can be defined by a central longitudinal axis 508. The central longitudinal axis 508 can be positioned co-axially with the filler neck 502. In some cases, a portion of the filler neck 502, proximate to the upper segment 522, is configured to function as a barrier against fluid ingress toward the housing 511. For example, during an overflow event, which can be characterized by a fluid level within the fluid tank 512 exceeding a height of the lower segment 524, the fluid can be diverted and directed laterally towards the lower segment 524 for controlled egress away from the housing 511.

The portable fluid tank system 500 can include a removable tank cap 514 for sealing the fluid tank 512. The tank cap 514 can be configured to engage with the spill face 504, such as via a screw-on or pop-on interface. This engagement can facilitate a secure and reliable seal over the fluid tank 512, reducing the risk of fluid spillage or contamination of the contents within the fluid tank 512.

The spill face 504 can include an annular rim 509 defining an aperture 505 allowing for fluid ingress into or egress from the fluid tank 512. The annular rim includes an upper segment 522 and a lower segment 524, with the upper segment 522 being at a higher elevation than the lower segment 524 and positioned in closer proximity to the housing 511, and thus the electronic components 510, in comparison to the lower segment 524. The spill face 504 can be integrally formed with the fluid tank 512.

The annular rim 509 can include an angled interface, which can be generally round or circular in shape. The annular rim 509 can be delineated by a decline that extends from the upper segment 522 to the lower segment 524, such that the upper segment 522 is at an elevation higher than the lower segment 524. In some configurations, the upper segment 522 may represent the highest point of the spill face, while the lower segment 524 is the lowest point. The elevation difference between the upper segment 522 and the lower segment 524 can facilitate the condition where, during normal filling or overflow operations, the upper segment 522 remains uncontacted by fluid.

In some cases, the upper segment 522 is closer to the electronic components 510 when compared to the lower segment 524. For example, the upper segment 522 may be aligned directly between the lower segment 524 and the electronic components 510, effectively acting as a barrier to protect the electronic components 510 from overflow. In such a configuration, as fluid fills the fluid tank 512 such that a fluid level within the fluid tank 512 exceeds an overflow threshold 528 corresponding to the lower segment 524, the fluid flows out of the spill face 504, across the lower segment 524. Further, the upper segment 522 of the spill face 504, proximal to the electronic components 510, is arranged to avoid fluid contact under normal operation conditions. Consequently, the spill face 504 and the filler neck 502 function to guide overflow fluid away from the electronic components 510, utilizing the lower elevation of the lower segment 524 as the primary exit route for excess fluid, thus aiding in the protection of the electronic components 510 from potential fluid-related damage. This spatial arrangement of the spill face 504 relative to the electronic components 510 advantageously enables the portable fluid tank system 500 to redirect overflow fluid away from the electronic components 510. The spatial configuration of the spill face 504 relative to the electronic components 510 can vary across embodiments. For instance, the lower segment 524 may not be directly aligned with the electronic components 510. Instead, the lower segment 524 could be positioned in a way that effectively prevents direct alignment of overflow fluid with the electronic components 510. This positioning could involve offsetting the lower segment 524 to one side or angling it differently to guide the flow of fluid away from sensitive areas.

In some cases, the lower segment 524 serves as a predefined liquid egress threshold, such that when fluid within the fluid tank 512 reaches a height corresponding to the lower segment (e.g., the overflow threshold 528), the spill face 504 facilitates an outward flow of the fluid from the fluid tank 512, where the outward flow is in a direction away from the housing 511 and, consequently, the electronic components 510.

The angle, denoted as X, of the annular rim 509 can be based on the intersection of two distinct planes: a spill face plane 523 (Plane A) and a reference plane 525 (Plane B). The spill face plane 523 can vary across embodiments. In some cases, the spill face plane 523 can refer to a two-dimensional geometric plane in which the points along the outermost boundary of the spill face 504 are co-located. In some such cases, the spill face plane 523 can effectively represent the orientation of an outer edge of spill face in a two-dimensional context. In some cases, the spill face plane 523 is a plane that is orthogonal to a central longitudinal axis 508 of the filler neck 502. In some such cases, the central longitudinal axis 508 can be co-axially aligned with the filler neck 502.

The reference plane 525 can vary across embodiments. In some cases, the reference plane 525 corresponds to a predefined level reference plane, assumed to be parallel to the ground when the portable fluid tank system 500 is in a standard operational orientation, resting on the base 570. In some cases, the reference plane 525 corresponds to a relatively horizontal plane of a top surface of the portable fluid tank system 500. In some cases, the reference plane 525 corresponds to a ground plane.

The angle, X, of the spill face 504 can vary across embodiments. For example, the angle, X, may be about 10°, about 20°, about 30°, about 40°, about 50°, about 60°, about 70°, or about 80°. As another example, the angle, X, may be more than about 15°, 20°, 25°, 30°, 35°, 40°, 45°, or 50° and/or than less than about 85°, 80°, 75°, 70°, 65°, 60°, 55°, or 50°. As another example, the angle, X, may be about 10° to about 80°, about 20° to about 70°, about 30° to about 60°, or about 40° to about 50°. The angle, X, of spill face 504 can advantageously exploit gravitational force, channeling excess fluids in a specific direction during the filling, overflow, and/or emptying processes, while reducing the likelihood of fluid contact with the set of electronic components 510 housed within portable fluid tank system 500.

Consider a scenario in which an operator commences the filling of the portable fluid tank system 500 with fluid. The operator introduces fluid into the fluid tank 512 through the filler neck 502, which is designed to receive and channel the fluid into the main reservoir of the fluid tank 512. As the fluid tank 512 approaches a capacity threshold, the fluid level rises to the entrance of the angled spill face 504. Should the incoming volume exceed the capacity of the fluid tank 512, or should the fluid be introduced at a flow rate that surpasses the accommodation ability of the fluid tank 512, the excess fluid will come into contact with the angled spill face 504. The oriented angle of the spill face 504 may then serve as a deflection surface, redirecting any overflow away from the set of electronic components 510. This deflection may be achieved by the spill face 504 being set at a predefined angle (e.g., is less than perpendicular to the top surface of the fluid tank), allowing gravity to guide the overflow fluid along the spill face. This redirection can mitigate the risk of fluid intrusion into sensitive electronic components and may reduce the likelihood of fluid spilling over the sides of the portable fluid tank system 500 in an uncontrolled manner. Conversely, when evacuating the contents of the portable fluid tank system 500, the angled spill face 504 can facilitate this process by providing a directed pathway for the fluid to exit, utilizing the gravitational pull to facilitate efficient and complete emptying of the contents of the fluid tank 512.

Example Dual-Handle Fluid Tank Structure

Figure 6:
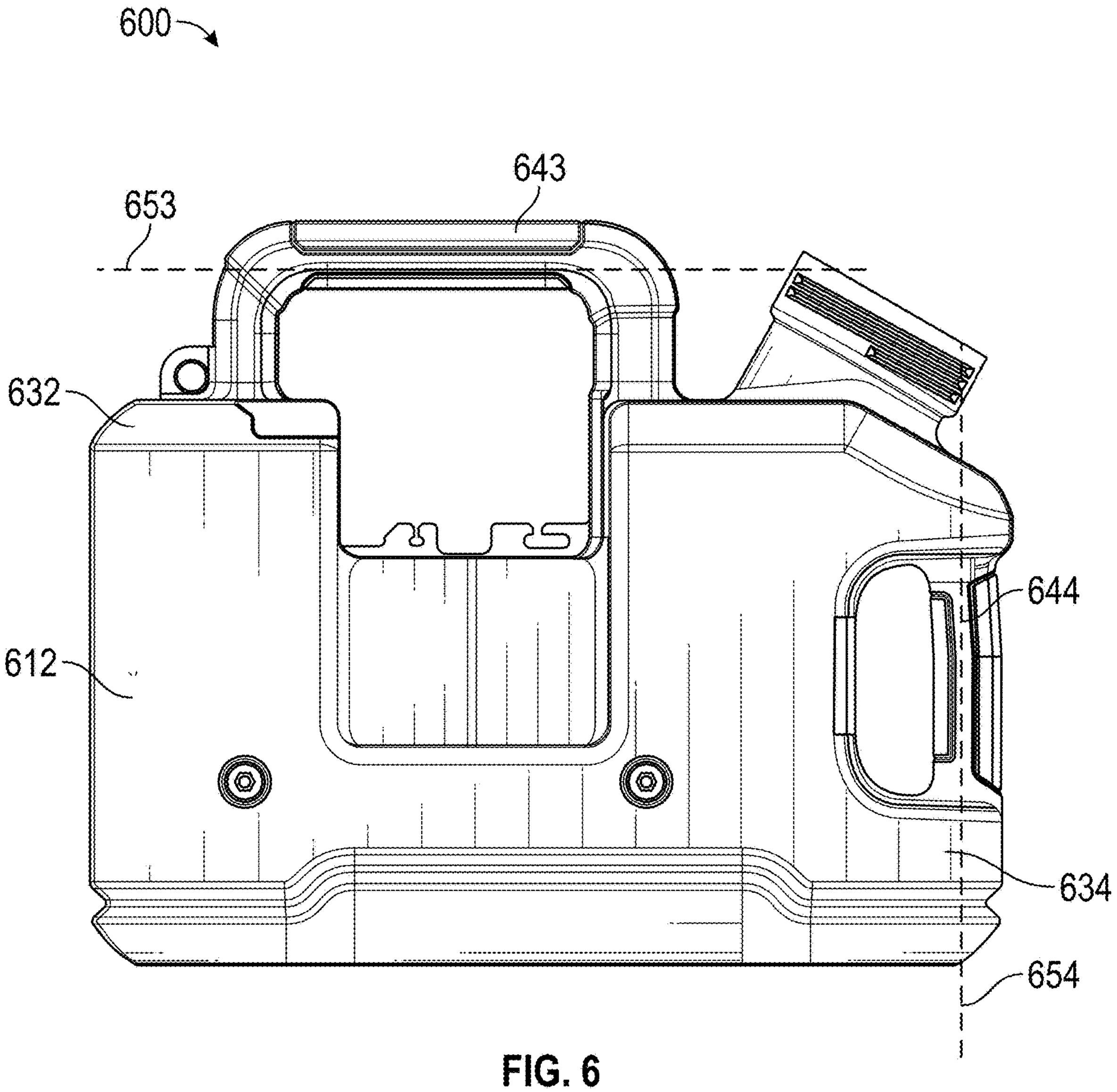
FIG. 6 illustrates a side view of an example portable fluid tank system, emphasizing the placement and design of two handles.

FIG. 6 depicts a side view of a fluid tank system 600, illustrating the positioning of a first handle 643 on an upper portion 632 of the system 600 and a second handle 644 on a side portion 634 of system 600. It will be appreciated that the portable fluid tank system 600 may be an embodiment of any of the portable fluid tank systems 100, 200, 400, 500, or 800 as described herein and illustrated in FIG. 1A-1C, 2A-2E, 4A-4C, 5A-5B, or 8A-8D, respectively.

The first handle 643 can be positioned on or proximate to a top or upper portion 632 of the fluid tank, with a longitudinal axis 653 of the first handle 643 generally aligned with (e.g., parallel to) a longitudinal axis of the fluid tank. Such a configuration can facilitate lifting along the tank's length. The second handle 644 can be positioned on or proximate to a side portion 634 of the fluid tank, with a longitudinal axis 654 of the second handle 644 is generally aligned with (e.g., parallel to) a lateral axis of the fluid tank. Such a configuration can facilitate lifting along the tank's breadth. This dual-handle configuration can advantageously enhance the versatility of the portable fluid tank system 600, allowing operators to select the carrying orientation based on specific operational needs or personal ergonomic preferences. For example, the first handle 643 may more easily facilitate one-handed vertical transportation, while the second handle 644 may more easily facilitate one-handed horizontal transportation. Furthermore, the first and second handles 643, 644 can provide an operator with multiple points of contact, allowing for a controlled and balanced maneuvering of the portable fluid tank system 600, regardless of the liquid volume within.

Although depicted such that the longitudinal axis 653 of the first handle 643 is oriented orthogonally to the longitudinal axis 654 of the second handle 644, it will be appreciated that the angular relationship between the first handle 643 and the second handle 644 can vary across embodiments, such as to optimize for different use cases. For example, in some cases, the angle between the longitudinal axis 653 of the first handle 643 and the longitudinal axis 654 of the second handle 644 is about Y degrees, with values of Y being about 60, 70, 80, 90, 100, 110, or 120 degrees. In some cases, the value of Y is between about 80° and 100°. In some cases, the angle, Y, may be adjusted to accommodate different lifting mechanics or to provide additional leverage points for operators during transportation or deployment of the portable fluid tank system 600.

The first handle 643 and/or the second handle 644 may be integrally formed with the fluid tank 612, such as through a blow-molding process. Thus, in some cases, the first handle 643, the second handle 644, and/or the fluid tank 612 can be formed together, without joints or seams. In some cases, the first handle 643, the second handle 644, and/or the fluid tank 612 include a monolithic structure that can contribute to the long-term durability and integrity of the portable fluid tank system 600.

The portable fluid tank system 600 can include a fluid tank 612 defining an internal volume for storage and conveyance of liquid. In some cases, one or both of the first handle 643 or the second handle 644 includes a hollow portion contributing to the internal volume of the fluid tank 612.

Example Diaphragm Pump

Figure 7A:
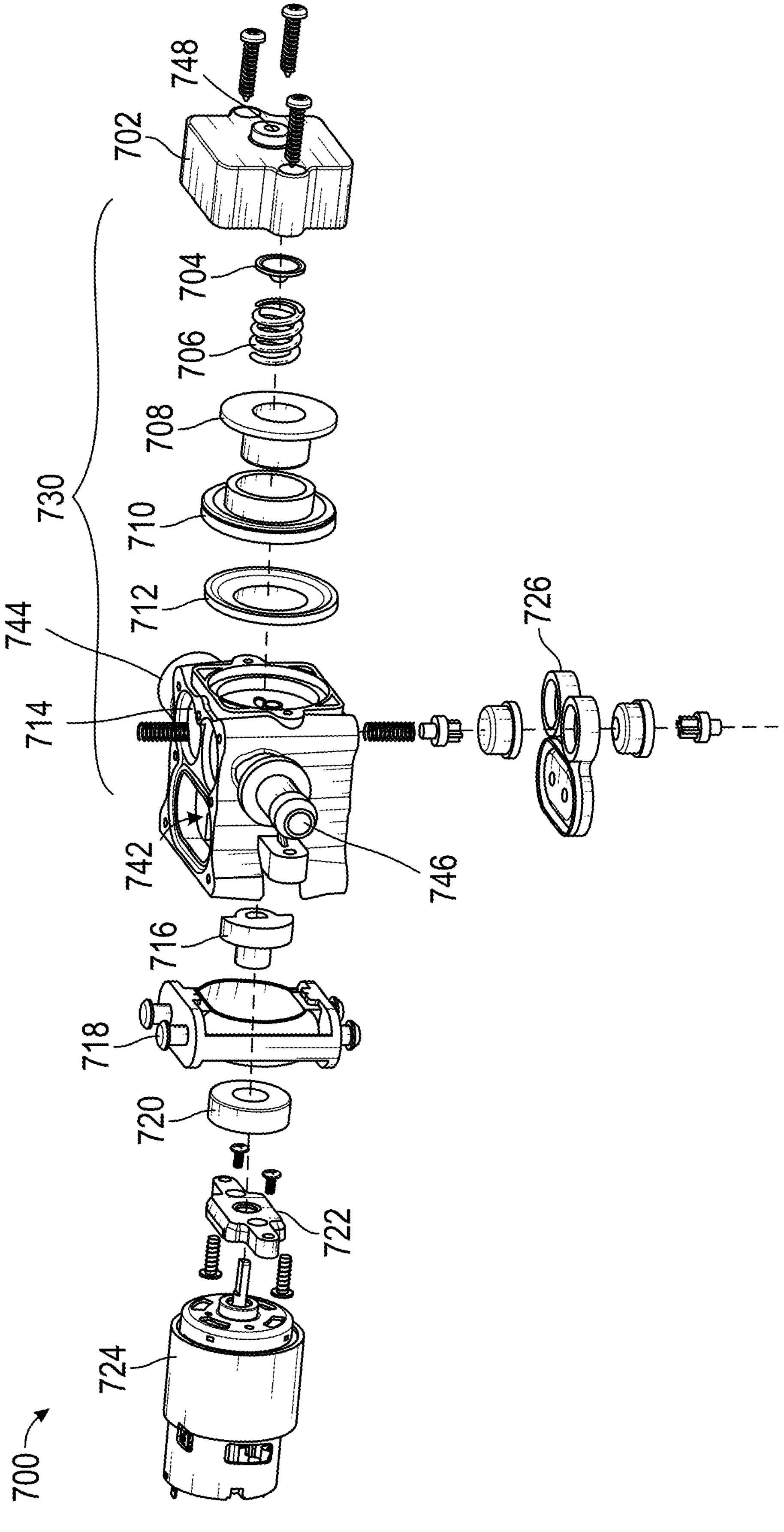
FIG. 7A illustrates an exploded view of a pump of an example portable fluid tank system.
Figure 7B:
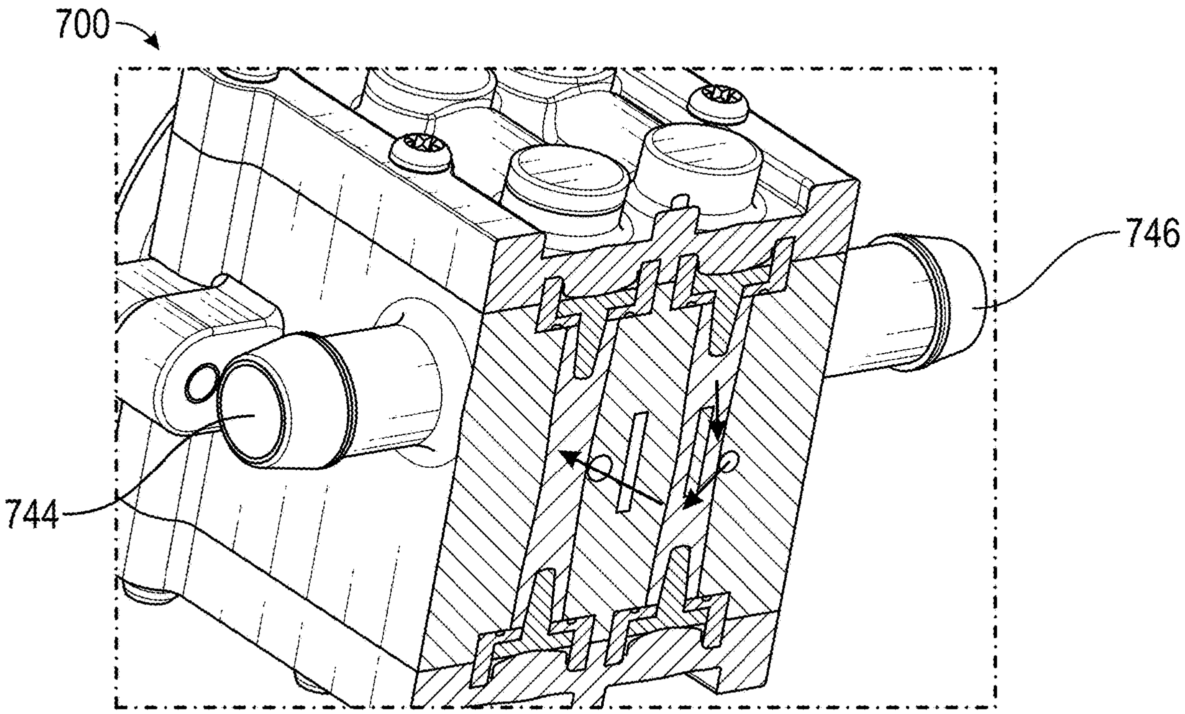
FIG. 7B illustrates a cross-sectional view of a diaphragm pump, detailing the interaction between the diaphragm, valves, and the fluid flow paths within the pump chamber.
Figure 7C:
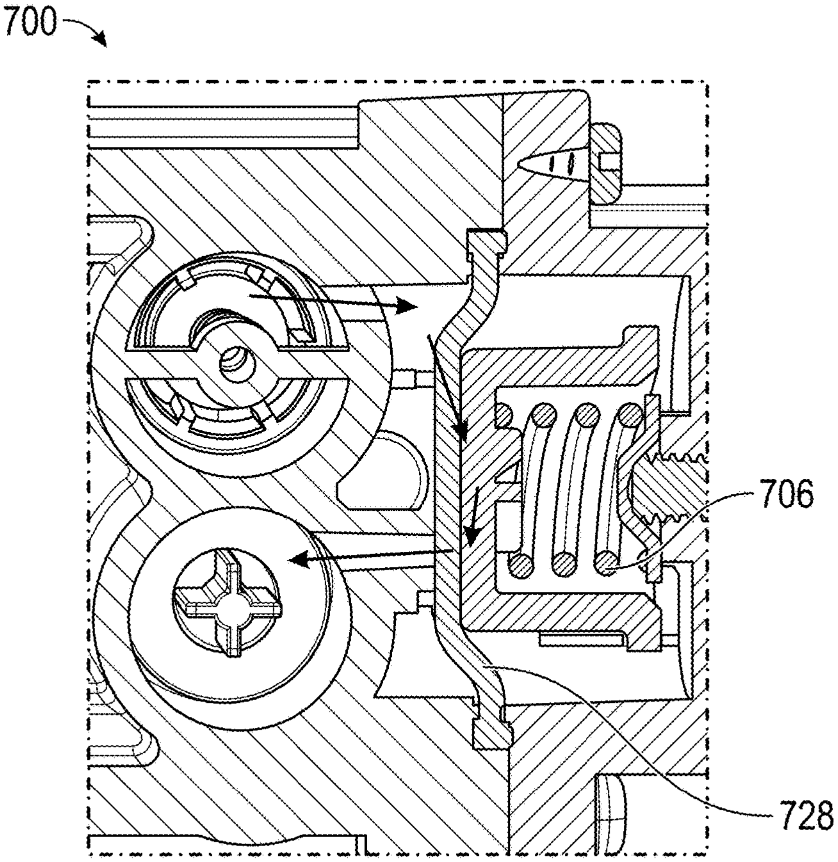
FIG. 7C illustrates a cross-sectional view of a diaphragm pump, detailing an internal arrangement of components including a flexible diaphragm, inlet and outlet valves, and a spring.
Figure 7D:
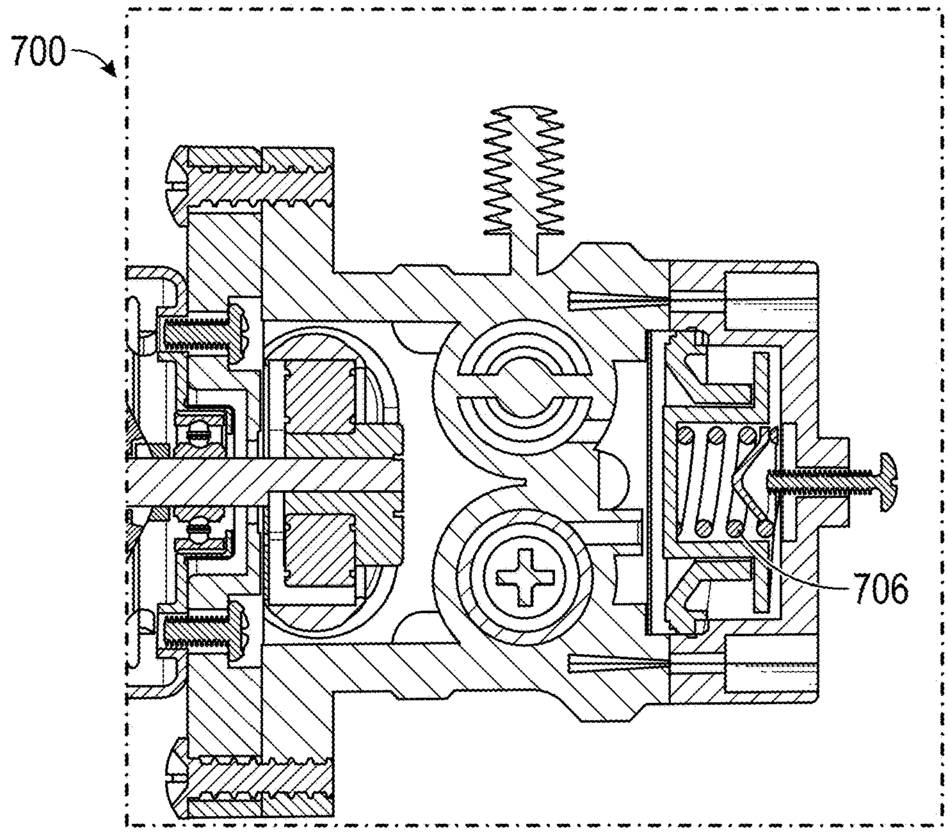
FIG. 7D illustrates a diaphragm pump including a reflux valve system with a spring-biased closure member at the return port on the pump body, configured to release fluid back to the inlet side when the outlet pressure surpasses a predefined spring force threshold.

FIG. 7A illustrates an exploded view of an example diaphragm pump 700, which may be an embodiment of the fluid actuation system 130. FIGS. 7B, 7C, and 7D illustrate cross-sectional views of the diaphragm pump 700, detailing the interaction between a diaphragm 728, valves, and the fluid flow paths within the pump chamber 742. It will be appreciated that the diaphragm pump 700 is compatible with and may be incorporated with any of the portable fluid tank systems described herein.

Referring to FIGS. 7A-7D, the diaphragm pump 700 can include a reflux valve cover 702, a gasket 704, a reflux valve spring 706, a spring cover 708, a pressing ring 710, a reflux valve sealing 712, a pump body 714, an eccentric wheel 716, a link lever 718, a bearing 720, a motor support 722, a motor 724, and a right pump cover 726.

The diaphragm pump 700 can include a pump body 714 that defines a pump chamber 742 which can be in fluid communication with an internal volume of the fluid tank (e.g., fluid tank 112 of FIG. 1A). Within the pump chamber, a flexible diaphragm 728 can be operable to variably pressurize the fluid, thereby facilitating its movement through a conduit.

The diaphragm pump 700 can include an inlet valve 744 and an outlet valve 746. The inlet valve 744 can be configured to allow fluid ingress into the pump chamber 742 during a draw phase, while the outlet valve 746 can be configured to allow fluid egress from the pump chamber 742 during a discharge phase. The inlet valve 744 and/or the outlet valve 746 can be one-way valves designed to prevent fluid backflow, thus facilitating unidirectional fluid flow within the system.

The actuation of the diaphragm pump 700 can be controlled by an electromechanical actuator which can be regulated by an electronic control unit. The electronic control unit can be responsible for modulating the actuation of the flexible diaphragm 728 based on predefined fluid pressure and flow rate parameters. The flexible diaphragm 728 can be constructed from a flexible material that can be chemically resistant to the fluid within the fluid tank.

The diaphragm pump 700 can incorporate a return valve system 130 (sometimes referred to as the reflux valve system) configured to mitigate overpressure conditions by permitting fluid to return to the inlet side if the outlet pressure exceeds a certain threshold. The return valve system 130 can include, but is not limited to, a gasket 704, a reflux valve spring 706, a spring cover 708, a pressing ring 710, a reflux valve sealing 712, the pump body 714, and/or the flexible diaphragm 728.

The return valve system 130 can include at least one return port 748 located on the pump body 714 and a spring-biased closure member (e.g., reflux valve spring 706) that normally seals the return port 748. The spring-biased closure member can be designed to open and allow the return of fluid when the outlet pressure overcomes the spring bias, reaching a predetermined threshold. As described herein, the return valve 730 assembly can be designed to provide a fail-safe mechanism, automatically activating to permit the return of fluid to the inlet side of the diaphragm pump when the outlet pressure exceeds the threshold force exerted by the spring 706, thus reducing a likelihood of potential overpressure damage to the diaphragm pump 700. For example, when the outlet pressure of the diaphragm pump 700 is greater than the spring force, the diaphragm will be pushed open, and the high pressure returns to the low pressure side of the water inlet to realize the release of the outlet pressure.

Example Automatically Closing Battery Compartment Cover

A portable fluid tank system can include a battery compartment housing designed to accommodate a removable energy storage device, such as a battery. The battery compartment housing defines an opening for inserting the removable energy storage device. A battery compartment cover is configured to removably seal this opening. In some configurations, the battery compartment cover is pivotably joined to the battery compartment housing via a biasing element. This biasing element can continually bias the battery compartment cover towards a closed position. For instance, the biasing element can consistently apply a force that urges the battery compartment cover to close. To open the battery compartment cover, a user may exert sufficient effort to overcome this biasing force. Once the user releases the battery compartment cover, the biasing force exerted by the biasing element can automatically return the battery compartment cover to its closed position. This consistent biasing towards closure can facilitate the automatic closing of the battery compartment cover when it is not intentionally held open.

Figure 8A:
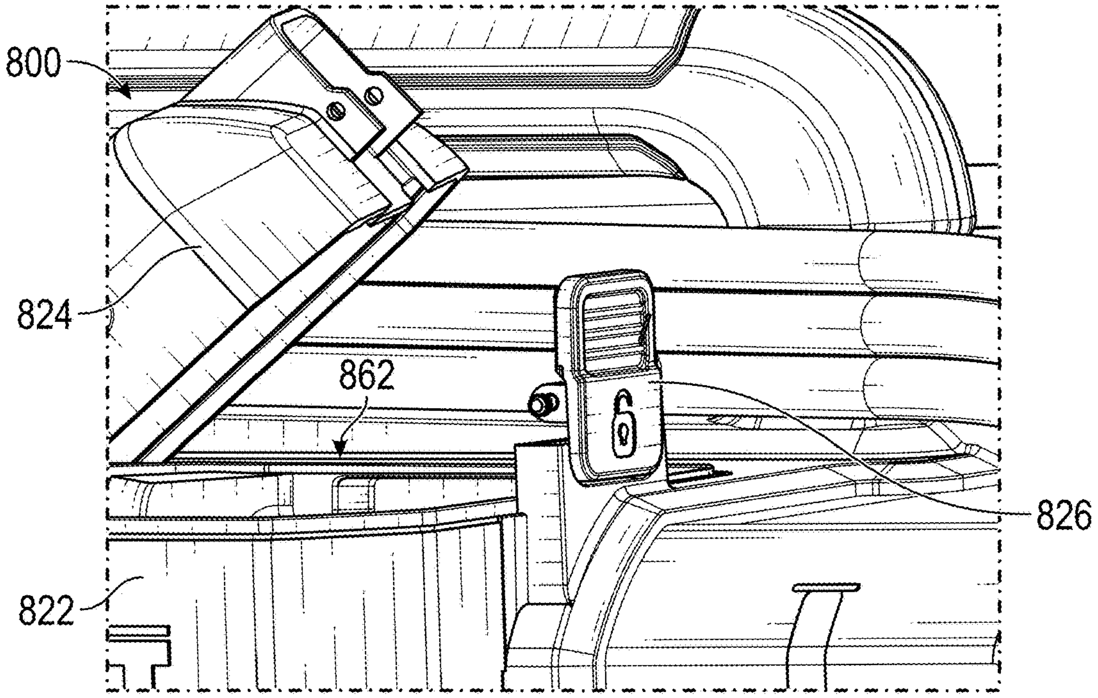
FIG. 8A illustrates a detailed perspective view of an example portable fluid tank system, showing a battery compartment in an open state.
Figure 8B:
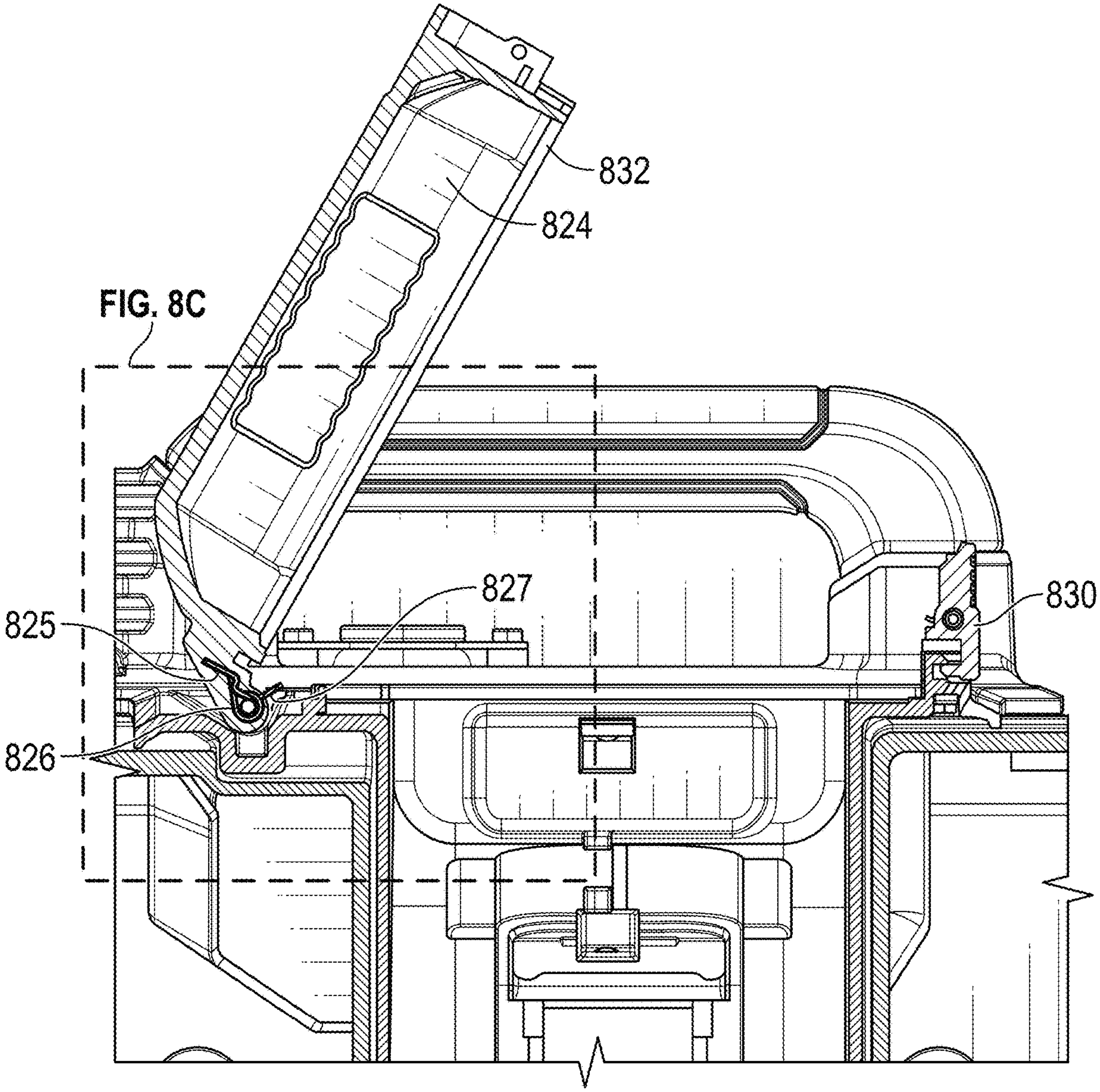
FIGS. 8B and 8C illustrate detailed side cross-sectional views of an example portable fluid tank system, emphasizing a position of a biasing element joining the battery compartment cover and the battery compartment housing.
Figure 8C:
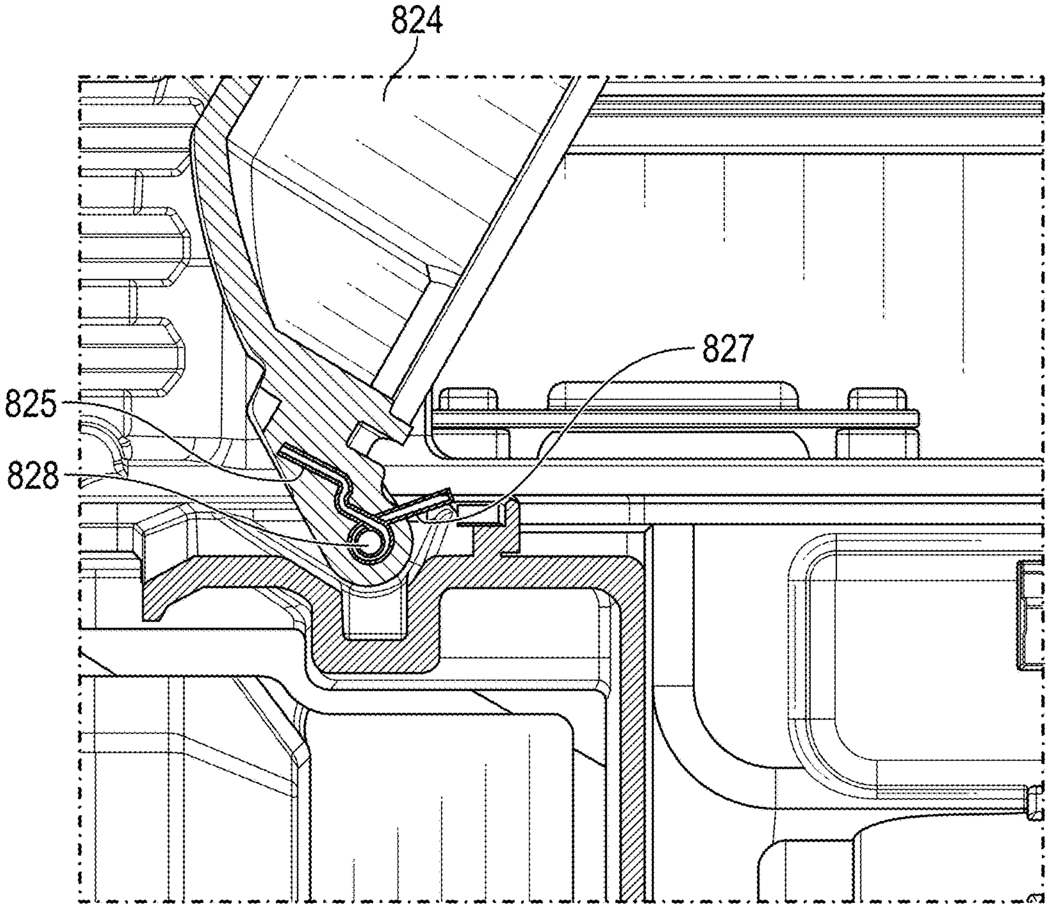
Figure 8D:
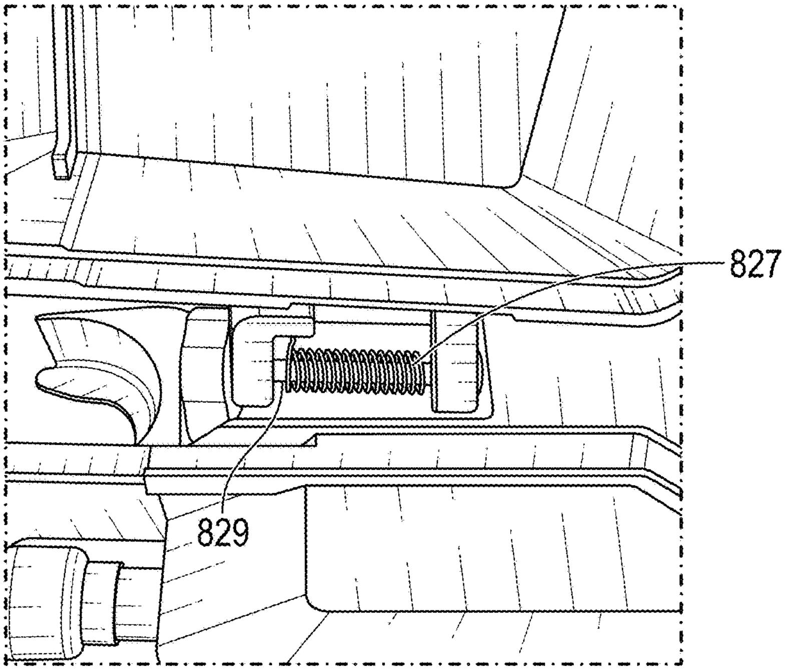
FIG. 8D illustrates a close-up view of the biasing element connecting the battery compartment cover to the housing, showing the battery compartment in an open state.

FIG. 8A illustrates a detailed perspective view of an example portable fluid tank system 800, showing a battery compartment housing 822 in an open state. FIGS. 8B and 8C illustrate detailed side cross-sectional views of the portable fluid tank system 800, emphasizing a position of a biasing element 826 joining the battery compartment cover and the battery compartment housing, and FIG. 8D illustrates a close-up view of the biasing element 826 connecting the battery compartment cover 824 to the battery compartment housing 822. It will be appreciated that the portable fluid tank system 800 may be an embodiment of any of the portable fluid tank systems 100, 200, 400, 500, or 600 as described herein and illustrated in FIG. 1A-1C, 2A-2E, 4A-4C, 5A-5B, or 6, respectively. The portable fluid tank system 800 can include a battery compartment housing 822, a battery compartment cover 824, a biasing element 826, a release button 828, a retention member 830, and a sealing member 832.

The battery compartment housing 822 can define a cavity 862 for a removable energy storage device (e.g., a battery). As described herein, when inserted into the cavity 862 and installed in the battery compartment housing 822, the removable energy storage device can electrically couple to and provide energy to the portable fluid tank system 800, such as to a fluid actuation system.

The battery compartment cover 824 (sometimes referred to as a battery compartment door) can serve as a detachable barrier for the cavity 862. For example, the battery compartment cover 824 can be moveable between an open position, permitting access to the cavity 862, and a closed position, concealing the cavity 862. The battery compartment cover 824 can be pivotably joined to the battery compartment housing 822, allowing the battery compartment cover 824 to pivot around a specific axis for opening and closing. For example, the portable fluid tank system 800 can include a biasing element 826, such as a torsion spring 826, positioned around a hinge pin 829 that connects the battery compartment cover 824 to the battery compartment housing 822. The torsion spring 826 can have a first arm 825 mechanically linked to the battery compartment cover 824 and a second arm 827 connected to the battery compartment housing 822. The torsion spring 826 can be configured to exert a rotational force on the battery compartment cover 824, encouraging it to move towards the closed position when not held open manually. To open the cover, a user may be required to apply enough effort to counter this biasing force of the biasing element 826. Upon releasing the battery compartment cover 824, the biasing force from the biasing element 826 can automatically return the battery compartment cover 824 to the closed position. Such a configuration can allow the battery compartment cover 824 to automatically and pivotally close in the absence of an external force.

The open position of the battery compartment cover 824 can vary across embodiments. For example, in some cases, the open position of the battery compartment cover 824 includes various positions, ranging from partially open to fully open, each allowing different levels of access to the cavity 862. In some cases, the open position is defined as any angular position of the battery compartment cover 824 relative to the battery compartment housing 822 that is greater than 0 degrees and up to a maximum angle at which the battery compartment cover 824 remains substantially supported by the battery compartment housing 822 without detaching. In some cases, the battery compartment cover 824 is considered to be in an open position when the battery compartment cover 824 forms an angle of at least 15 degrees with a plane of the battery compartment housing 822, enabling access to the cavity 862.

The implementation of the biasing element 826 can vary across embodiments. For instance, suitable self-closure mechanisms for the biasing element 826 can include a spring, a torsion bar, an elastomeric band, among others. Furthermore, in some cases, the biasing element 826 can include a damping feature. The damping feature can regulate the speed at which the battery compartment cover 824 moves as it transitions from the open to the closed position.

In some cases, the portable fluid tank system 800 includes a release button 828 mechanically coupled to a retention member 830 within the battery compartment housing 822. Actuating the release button 828 can disengage the retention member 830, allowing manual opening of the battery compartment cover 824 against the force of the biasing element 826. In some cases, the retention member 830 includes a latch that engages with a corresponding structure on the battery compartment cover 824, disengageable by the release button 828. However, it will be appreciated that the implementation of the retention member 830 can vary across embodiments. For example, in some cases, the retention member 830 may be a magnetic element affixed to the battery compartment housing 822, working in conjunction with a metallic component on the battery compartment cover 824 to create a magnetic bond. In some such cases, the magnetic bond can hold the battery compartment cover 824 in the closed position, and the battery compartment cover 824 can be manually opened by applying a force sufficient to overcome the magnetic bond and the bias of the biasing element 826.

In some cases, the portable fluid tank system 800 can include a sealing member 832 positioned between the battery compartment cover 824 and the battery compartment housing 822 to provide a seal when the battery compartment cover 824 is in the closed position.

Example Embodiments

Various example embodiments of methods or systems related to a portable fluid tank system with features such as a latch receiving portion, wireless tool connectivity, angled spill face, two handles, or a diaphragm pump, as described herein can be found in the following clauses:

Clause 1. A portable fluid tank system, comprising:

a fluid tank comprising an internal volume for holding fluid;

a fluid actuation system configured to facilitate controlled movement and pressurization of the fluid in the fluid tank for ejection through a conduit;

an electronics housing defining a cavity to accommodate a removable energy storage device, the removable energy storage device configured to electrically couple and provide energy to the fluid actuation system; and a mounting assembly coupled to the fluid tank, the mounting assembly comprising a first engagement member being configured to mechanically engage with a complementary second engagement member of an external docking assembly, wherein engagement of the first engagement member and the second engagement member secures the portable fluid tank system to the external docking assembly.

Clause 2. The system of any of the previous clauses, wherein the mounting assembly comprises a mounting frame configured to removably couple to an exterior of the fluid tank, wherein the first engagement member is integral with the mounting frame.

Clause 3. The system of clause 2, wherein the mounting frame extends around an entire periphery of an exterior surface of the fluid tank.

Clause 4. The system of clause 3, wherein the mounting frame fits against the exterior surface of the fluid tank to provide a substantially contiguous interface with the exterior surface of the fluid tank.

Clause 5. The system of clause 2, wherein the mounting frame is contoured to substantially match an exterior geometry of the fluid tank.

Clause 6. The system of any of the previous clauses, wherein the first engagement member comprises a pair of latch engaging structures and the second engagement member comprises a pair of latches.

Clause 7. The system of clause 6, wherein the latch engaging structures are disposed on opposite lateral sides of the fluid tank.

Clause 8. The system of any of the previous clauses, wherein the external docking assembly is part of a top surface of a container module, the container module being configured to provide storage for tools.

Clause 9. The system of any of the previous clauses, wherein the mounting assembly includes a series of slots configured to receive the second engagement member.

Clause 10. The system of any of the previous clauses, wherein the mounting assembly is part of a quick-connect coupling system on the fluid tank for easy attachment and detachment from external docking assemblies.

Clause 11. The system of any of the previous clauses, further comprising a spill face integrally formed with the fluid tank, the spill face including an annular rim that defines an aperture to allow for fluid ingress into or egress from the fluid tank, wherein the annular rim comprises an upper segment and a lower segment, with the upper segment positioned at a higher elevation compared to the lower segment and located in closer proximity to the electronics housing than the lower segment, the electronics housing defining a cavity to accommodate a removable energy storage device configured to electrically couple and provide energy to the portable fluid tank system.

Clause 12. The system of any of the previous clauses, further comprising:

a fluid actuation system configured to facilitate controlled movement and pressurization of the fluid in the fluid tank for ejection through a conduit;

a multi-state control interface, positioned on an exterior of the portable fluid tank system, the multi-state control interface configured to enable transition between various states of operation of the fluid actuation system; and a communication module configured to interpret and execute command signals received from a remote transmitting device via a wireless communication network, wherein activation of the fluid actuation system can be effectuated through direct user interaction with the multi-state control interface or remotely via the remote transmitting device.

Clause 13. The system of any of the previous clauses, further comprising:

a first handle positioned on a top surface of the fluid tank; and a second handle positioned on a side surface of the fluid tank.

Clause 14. The system of any of the previous clauses, wherein the fluid actuation system comprises a diaphragm pump, the diaphragm pump being configured to oscillate a flexible diaphragm to variably alter the internal volume, thereby facilitating intake, pressurization, and ejection of the fluid through the conduit.

Clause 15. A portable fluid tank system, comprising:

a fluid tank comprising an internal volume for holding fluid;

a fluid actuation system configured to facilitate controlled movement and pressurization of the fluid in the fluid tank for ejection through a conduit;

a multi-state control interface, positioned on an exterior of the portable fluid tank system, the multi-state control interface configured to enable transition between various states of operation of the fluid actuation system; and a communication module configured to interpret and execute command signals received from a remote transmitting device via a wireless communication network, wherein activation of the fluid actuation system can be effectuated through direct user interaction with the multi-state control interface or remotely via the remote transmitting device.

Clause 16. The system of any of the previous clauses, wherein the fluid actuation system comprises a diaphragm pump, the diaphragm pump being configured to oscillate a flexible diaphragm to variably alter the internal volume, thereby facilitating intake, pressurization, and ejection of the fluid through the conduit.

Clause 17. The system of any of the previous clauses, wherein operational control of the fluid actuation system via the remote transmitting device is conditional upon both a successful pairing of the remote transmitting device with the system and activation of a wireless control mode.

Clause 18. The system of clause 17, further comprising a pairing button, wherein the pairing button is configured to facilitate establishment of the successful pairing of the remote transmitting device with the fluid tank system.

Clause 19. The system of any of the previous clauses, wherein the multi-state control interface comprises a dedicated selector for activating a wireless control mode, wherein the wireless control mode, when activated, enables remote operational control of the fluid actuation system via the remote transmitting device, and wherein the wireless control mode, when deactivated, disables the remote operational control of the fluid actuation system via the remote transmitting device.

Clause 20. The system of any of the previous clauses, wherein the multi-state control interface comprises a three-position switch, wherein alignment of the three-position switch to a first position activates a wireless control mode enabling remote operational control of the fluid actuation system via the remote transmitting device, wherein alignment of the three-position switch to a second position activates the fluid actuation system, and wherein alignment of the three-position switch to a third position places the fluid actuation system into an inactive state.

Clause 21. The system of any of the previous clauses, wherein the communication module is configured to receive a start command from the remote transmitting device to activate the fluid actuation system.

Clause 22. The system of any of the previous clauses, further comprising a housing defining a cavity to accommodate a removable energy storage device, the removable energy storage device configured to electrically couple and provide energy to the fluid actuation system.

Clause 23. The system of any of the previous clauses, further comprising a mounting assembly coupled to the fluid tank, the mounting assembly comprising a first engagement member being configured to mechanically engage with a complementary second engagement member of an external docking assembly, wherein engagement of the first engagement member and the second engagement member secures the portable fluid tank system to the external docking assembly.

Clause 24. The system of any of the previous clauses, further comprising a spill face integrally formed with the fluid tank, the spill face including an annular rim that defines an aperture to allow for fluid ingress into or egress from the fluid tank, wherein the annular rim comprises an upper segment and a lower segment, with the upper segment positioned at a higher elevation compared to the lower segment and located in closer proximity to a housing than the lower segment, the housing defining a cavity to accommodate a removable energy storage device configured to electrically couple and provide energy to the portable fluid tank system.

Clause 25. The system of any of the previous clauses, further comprising:

a fluid actuation system configured to facilitate controlled movement and pressurization of the fluid in the fluid tank for ejection through a conduit;

a multi-state control interface, positioned on an exterior of the portable fluid tank system, the multi-state control interface configured to enable transition between various states of operation of the fluid actuation system; and a communication module configured to interpret and execute command signals received from a remote transmitting device via a wireless communication network, wherein activation of the fluid actuation system can be effectuated through direct user interaction with the multi-state control interface or remotely via a remote transmitting device.

Clause 26. The system of any of the previous clauses, further comprising:

a first handle positioned on a top surface of the fluid tank; and a second handle positioned on a side surface of the fluid tank.

Clause 27. The system of any of the previous clauses, wherein the fluid actuation system comprises a diaphragm pump, the diaphragm pump being configured to oscillate a flexible diaphragm to variably alter the internal volume, thereby facilitating the intake, pressurization, and ejection of the fluid through the conduit.

Clause 28. A remote transmitting device for a portable fluid tank system, the remote transmitting device comprising:

a communication module configured to wirelessly transmit command signals to a portable fluid tank system, wherein the portable fluid tank system comprises an internal volume for holding fluid, and a fluid actuation system configured to facilitate controlled movement and pressurization of the fluid in the portable fluid tank system for ejection through a conduit;

a pairing mechanism configured to facilitate establishment of a successful pairing of the remote transmitting device with the fluid tank system;

a user-operable button incorporated into the remote transmitting device, wherein while successfully paired with the portable fluid tank system, activation of the user-operable button transmits the command signals to the portable fluid tank system to toggle an operational state between an active state and an inactive state.

Clause 29. A portable fluid tank system, comprising:

a fluid tank comprising an internal volume for holding fluid;

a fluid actuation system configured to facilitate controlled movement and pressurization of the fluid in the fluid tank for ejection through a conduit;

an electronics housing defining a cavity to accommodate a removable energy storage device, the removable energy storage device configured to electrically couple and provide energy to the fluid actuation system; and a spill face integrally formed with the fluid tank, the spill face comprising an annular rim defining an aperture allowing for fluid ingress into or egress from the fluid tank, wherein the annular rim includes an upper segment and a lower segment with the upper segment being at a higher elevation than the lower segment and positioned in closer proximity to the electronics housing in comparison to the lower segment.

Clause 30. The system of any of the previous clauses, wherein the lower segment of the annular rim serves as a predefined liquid egress threshold, such that when fluid within the fluid tank reaches a height corresponding to the lower segment, the spill face facilitates an outward flow of the fluid from the fluid tank away from the electronics housing.

Clause 31. The system of clause 30, wherein the outward flow is in a direction away from the electronics housing.

Clause 32. The system of any of the previous clauses, further comprising a filler neck contiguous with the spill face and the fluid tank, wherein the filler neck terminates in the spill face.

Clause 33. The system of clause 32, wherein a portion of the filler neck, proximate to the upper segment of the annular rim, is configured to function as a barrier against fluid ingress toward the electronics housing, such that during an overflow event in which a fluid level within the fluid tank exceeds a height of the lower segment of the annular rim, the fluid is diverted and directed laterally towards the lower segment of the annular rim.

Clause 34. The system of any of the previous clauses, wherein a height differential between the upper segment and the lower segment of the annular rim prevents fluid within the fluid tank from contacting the upper segment under normal and maximum fill conditions.

Clause 35. The system of any of the previous clauses, wherein the annular rim is characterized by a decline extending from the upper segment to the lower segment, wherein an angle of the decline is between 20° and 40°.

Clause 36. The system of clause 35, wherein the angle of the decline is between 25° and 35°.

Clause 37. The system of clause 35, wherein the angle of the decline is about 30°.

Clause 38. The system of clause 38, wherein the angle is defined by an intersection between a spill face plane and a reference plane, wherein the spill face plane corresponds to a two-dimensional geometric plane in which points along an outermost boundary of the annular rim are co-located, and wherein the reference plane corresponds to a level reference plane that is parallel to ground when the portable fluid tank system is in a standard operational orientation.

Clause 39. The system of any of the previous clauses, wherein the upper segment and the lower segment of the annular rim correspond to a highest point and a lowest point, respectively, of the spill face.

Clause 40. The system of any of the previous clauses, wherein the annular rim is associated with a detachable tank cap, the detachable tank cap being selectively engageable with the annular rim to cover the aperture of the spill face.

Clause 41. The system of any of the previous clauses, wherein the electronics housing is mounted to the fluid tank such that the electronics housing forms a part of an external contour of the fluid tank.

Clause 42. The system of any of the previous clauses, wherein the electronics housing is integrated into the fluid tank in a manner that positions the cavity above and apart from the internal volume for holding fluid.

Clause 43. The system of any of the previous clauses, wherein the electronics housing is detachable from the fluid tank.

Clause 44. The system of any of the previous clauses, wherein the electronics housing further accommodates a wireless communications module.

Clause 45. The system of any of the previous clauses, further comprising a mounting assembly coupled to the fluid tank, the mounting assembly comprising a first engagement member being configured to mechanically engage with a complementary second engagement member of an external docking assembly, wherein engagement of the first engagement member and the second engagement member secures the portable fluid tank system to the external docking assembly.

Clause 46. The system of any of the previous clauses, wherein the electronics housing further accommodates:

a multi-state control interface, positioned on an exterior of the electronics housing, the multi-state control interface configured to enable transition between various states of operation of the fluid actuation system; and a communication module configured to interpret and execute command signals received from a remote transmitting device via a wireless communication network, wherein activation of the fluid actuation system can be effectuated through direct user interaction with the multi-state control interface or remotely via a remote transmitting device.

Clause 47. The system of any of the previous clauses, further comprising:

a first handle positioned on a top surface of the fluid tank; and a second handle positioned on a side surface of the fluid tank.

Clause 48. The system of any of the previous clauses, wherein the fluid actuation system comprises a diaphragm pump, the diaphragm pump being configured to oscillate a flexible diaphragm to variably alter the internal volume, thereby facilitating intake, pressurization, and ejection of the fluid through the conduit.

Clause 49. A portable fluid tank system, comprising:

a fluid tank comprising an internal volume for holding fluid;

a fluid actuation system configured to facilitate controlled movement and pressurization of the fluid in the fluid tank for ejection through a conduit;

an electronics housing defining a cavity to accommodate a removable energy storage device, the removable energy storage device configured to electrically couple and provide energy to the fluid actuation system;

a first handle positioned on a top surface of the fluid tank; and a second handle positioned on a side surface of the fluid tank.

Clause 50. The system of any of the previous clauses, wherein a longitudinal axis of the first handle is oriented orthogonally to a longitudinal axis of the second handle.

Clause 51. The system of any of the previous clauses, wherein a longitudinal axis of the first handle is aligned with a longitudinal axis of the fluid tank, and a longitudinal axis of the second handle is aligned with a lateral axis of the fluid tank.

Clause 52. The system of any of the previous clauses, wherein at least one of the first handle or the second handle includes a hollow portion contributing to the internal volume of the fluid tank.

Clause 53. The system of any of the previous clauses, wherein the fluid tank, the first handle, and the second handle form a monolithic structure without joints or seams.

Clause 54. The system of any of the previous clauses, wherein the first handle and the second handle are produced in a single manufacturing process with the fluid tank by blow molding.

Clause 55. The system of clause 6, wherein the first handle is proximal to the electronics housing relative to the second handle.

Clause 56. The system of any of the previous clauses, further comprising a filler neck contiguous with the fluid tank and terminating in a spill face, the spill face comprising an annular rim defining an aperture allowing for fluid ingress into or egress from the fluid tank.

Clause 57. The system of clause 8, wherein the filler neck extends from the fluid tank at an angle that bisects a first plane defined by a longitudinal axis of the first handle and a second plane defined by a longitudinal axis of the second handle.

Clause 58. The system of clause 9, wherein the longitudinal axis of the first handle is oriented orthogonally to the longitudinal axis of the second handle, and the filler neck extends from the fluid tank at an angle that equally divides orthogonal axes of the first handle and the second handle.

Clause 59. The system of clause 10, wherein a longitudinal axis of the first handle is oriented at an angle of 0 degrees, a longitudinal axis of the second handle is oriented at an angle between 80° and 100°, and the filler neck extends from the fluid tank at an angle between 35° and 55°.

Clause 60. The system of clause 11, wherein the spill face is disposed on the fluid tank at a position between the first handle and the second handle.

Clause 61. The system of any of the previous clauses, wherein a longitudinal axis of second handle is oriented at a predefined angle with respect to a longitudinal axis of the first handle, wherein the predefined angle is between 80° and 100°.

Clause 62. The system of clause 13, wherein the predefined angle is 90°.

Clause 63. The system of any of the previous clauses, further comprising a mounting assembly coupled to the fluid tank, the mounting assembly comprising a first engagement member being configured to mechanically engage with a complementary second engagement member of an external docking assembly, wherein engagement of the first engagement member and the second engagement member secures the portable fluid tank system to the external docking assembly.

Clause 64. The system of any of the previous clauses, further comprising:

a multi-state control interface, positioned on an exterior of the electronics housing, the multi-state control interface configured to enable transition between various states of operation of the fluid actuation system; and a communication module configured to interpret and execute command signals received from a remote transmitting device via a wireless communication network, wherein activation of the fluid actuation system can be effectuated through direct user interaction with the multi-state control interface or remotely via a remote transmitting device.

Clause 65. The system of any of the previous clauses, wherein the fluid actuation system comprises a diaphragm pump, the diaphragm pump being configured to oscillate a flexible diaphragm to variably alter the internal volume, thereby facilitating intake, pressurization, and ejection of the fluid through the conduit.

Clause 66. A portable fluid tank system, comprising:

a fluid tank comprising an internal volume for holding fluid;

a diaphragm pump integrated with the fluid tank for pressurizing and moving the fluid, wherein the diaphragm pump comprises a pump body that defines a pump chamber in fluid communication with the internal volume, and a flexible diaphragm operable within the pump chamber to variably pressurize the fluid and facilitate movement of the fluid through a conduit; and a battery compartment housing to accommodate a removable energy storage device that provides power to the diaphragm pump, enabling controlled movement and pressurization of the fluid.

Clause 67. The system of any of the previous clauses, wherein the diaphragm pump further comprises an inlet valve and an outlet valve, the inlet valve allowing fluid ingress into the pump chamber during a draw phase and the outlet valve allowing fluid egress from the pump chamber during a discharge phase.

Clause 68. The system of clause 67, wherein the inlet valve and the outlet valve are one-way valves that prevent backflow of fluid, ensuring unidirectional fluid flow within the system.

Clause 69. The system of any of the previous clauses, wherein the diaphragm pump is actuated by an electromechanical actuator that is controlled by an electronic control unit, the electronic control unit regulating actuation of the flexible diaphragm based on desired fluid pressure and flow rate parameters.

Clause 70. The system of any of the previous clauses, wherein the flexible diaphragm is made from a flexible material that is chemically resistant to the fluid within the fluid tank.

Clause 71. The system of any of the previous clauses, wherein the diaphragm pump includes a pressure relief mechanism that activates to redirect fluid back to an inlet side of the pump chamber when a pressure within the pump chamber exceeds a predetermined safety threshold.

Clause 72. The system of any of the previous clauses, wherein the diaphragm pump includes a reflux valve system that operates to prevent overpressure conditions by allowing fluid to return to an inlet side when an outlet pressure exceeds a predetermined threshold.

Clause 73. The system of clause 72, wherein the reflux valve system includes at least one return port located on the pump body and a spring-biased closure member that normally seals the at least one return port, the spring-biased closure member being configured to open and allow the return of fluid when the outlet pressure overcomes a spring bias, reaching the predetermined threshold.

Clause 74. The system of any of the previous clauses, further comprising a mounting assembly coupled to the fluid tank, the mounting assembly comprising a first engagement member being configured to mechanically engage with a complementary second engagement member of an external docking assembly, wherein engagement of the first engagement member and the second engagement member secures the portable fluid tank system to the external docking assembly.

Clause 75. The system of any of the previous clauses, further comprising a spill face integrally formed with the fluid tank, the spill face including an annular rim that defines an aperture to allow for fluid ingress into or egress from the fluid tank, wherein the annular rim comprises an upper segment and a lower segment, with the upper segment positioned at a higher elevation compared to the lower segment and located in closer proximity to the battery compartment housing than the lower segment.

Clause 76. The system of any of the previous clauses, further comprising:

a multi-state control interface, positioned on an exterior of the portable fluid tank system, the multi-state control interface configured to enable transition between various states of operation of the diaphragm pump; and a communication module configured to interpret and execute command signals received from a remote transmitting device via a wireless communication network, wherein activation of the diaphragm pump can be effectuated through direct user interaction with the multi-state control interface or remotely via the remote transmitting device.

Clause 77. The system of any of the previous clauses, further comprising:

a first handle positioned on a top surface of the fluid tank; and a second handle positioned on a side surface of the fluid tank.

Clause 78. The system of any of the previous clauses, wherein the battery compartment housing defines a cavity to accommodate the removable energy storage device, wherein the system further comprises:

a battery compartment cover pivotably joined to the battery compartment housing and moveable between an open position allowing access to the cavity and a closed position concealing the cavity; and a biasing element associated with the battery compartment cover, the biasing element urging the battery compartment cover toward the closed position to effectuate movement of the battery compartment cover from the open position to the closed position without.

Clause 79. A portable fluid tank system, comprising:

a fluid tank comprising an internal volume for holding fluid;

a fluid actuation system configured to facilitate controlled movement and pressurization of the fluid in the fluid tank for ejection through a conduit;

a battery compartment housing defining a cavity to accommodate a removable energy storage device, the removable energy storage device configured to electrically couple and provide energy to the fluid actuation system;

a battery compartment cover pivotably joined to the battery compartment housing and moveable between an open position allowing access to the cavity and a closed position concealing the cavity; and a biasing element associated with the battery compartment cover, the biasing element urging the battery compartment cover toward the closed position to effectuate movement of the battery compartment cover from the open position to the closed position without detaching.

Clause 80. The system of any of the previous clauses, wherein the biasing element comprises a torsion spring positioned around a hinge pin that pivotably joins the battery compartment cover to the battery compartment housing, the torsion spring having a first arm in mechanical communication with the battery compartment cover and a second arm in mechanical communication with the battery compartment housing, wherein the torsion spring is configured to provide a rotational force to the battery compartment cover, urging the battery compartment cover toward the closed position when the battery compartment cover is not manually held open, thereby enabling the battery compartment cover to automatically and pivotally close in the absence of an external force maintaining the battery compartment cover in the open position.

Clause 81. The system of any of the previous clauses, wherein the biasing element is configured to enable the battery compartment cover to automatically transition from the open position to the closed position upon release of any manual or mechanical hold, without requiring active intervention from a user, thus effectuating automatic closure of the battery compartment cover.

Clause 82. The system of any of the previous clauses, wherein the biasing element that exerts a force on the battery compartment cover to pivot from the open position to the closed position.

Clause 83. The system of any of the previous clauses, further comprising a release button mechanically coupled to a retention member within the battery compartment housing, wherein the release button is configured to disengage the retention member upon actuation, wherein disengagement of the retention member by the release button allows for manual opening of the battery compartment cover against a biasing force provided by the biasing element that biases the battery compartment cover towards the closed position.

Clause 84. The portable fluid tank system of clause 83, wherein the retention member includes a latch that engages with a corresponding structure on the battery compartment cover, the latch being disengageable in response to activation of the release button.

Clause 85. The system of any of the previous clauses, further comprising a magnetic element affixed to the battery compartment housing, which cooperates with a corresponding metallic component on the battery compartment cover to create a magnetic bond holding the battery compartment cover in the closed position, and wherein the battery compartment cover can be manually opened by applying a force sufficient to overcome the magnetic bond, against a bias of the biasing element.

Clause 86. The system of any of the previous clauses, further comprising a retention member configured to releasably retain the battery compartment cover in the open position against a force of the biasing element.

Clause 87. The system of any of the previous clauses, wherein the biasing element is one of a spring, a torsion bar, or an elastomeric band.

Clause 88. The system of any of the previous clauses, further comprising a sealing member positioned to provide a seal between the battery compartment cover and the battery compartment housing when the battery compartment cover is in the closed position.

Clause 89. The system of any of the previous clauses, further comprising a damping feature that controls a rate of movement of the battery compartment cover when transitioning from the open position to the closed position.

Clause 90. The system of any of the previous clauses, wherein the open position of the battery compartment cover is defined as any angular position of the battery compartment cover relative to the battery compartment housing that is greater than 0 degrees and up to a maximum angle at which the battery compartment cover remains substantially supported by the battery compartment housing without detaching.

Clause 91. The system of any of the previous clauses, wherein the battery compartment cover is considered to be in an open position when it forms an angle of at least 15 degrees with a plane of the battery compartment housing, enabling unobstructed access to the cavity.

Clause 92. The system of any of the previous clauses, wherein the open position of the battery compartment cover includes a range of stable resting positions between partially open and fully open, each position allowing for varying degrees of access to the cavity.

Clause 93. The system of any of the previous clauses, further comprising a mounting assembly coupled to the fluid tank, the mounting assembly comprising a first engagement member being configured to mechanically engage with a complementary second engagement member of an external docking assembly, wherein engagement of the first engagement member and the second engagement member secures the portable fluid tank system to the external docking assembly.

Clause 94. The system of any of the previous clauses, further comprising a spill face integrally formed with the fluid tank, the spill face including an annular rim that defines an aperture to allow for fluid ingress into or egress from the fluid tank, wherein the annular rim comprises an upper segment and a lower segment, with the upper segment positioned at a higher elevation compared to the lower segment and located in closer proximity to the battery compartment housing than the lower segment.

Clause 95. The system of any of the previous clauses, further comprising:

a multi-state control interface, positioned on an exterior of the portable fluid tank system, the multi-state control interface configured to enable transition between various states of operation of the fluid actuation system; and a communication module configured to interpret and execute command signals received from a remote transmitting device via a wireless communication network, wherein activation of the fluid actuation system can be effectuated through direct user interaction with the multi-state control interface or remotely via a remote transmitting device.

Clause 96. The system of any of the previous clauses, further comprising:

a first handle positioned on a top surface of the fluid tank; and a second handle positioned on a side surface of the fluid tank.

Clause 97. The system of any of the previous clauses, wherein the fluid actuation system comprises a diaphragm pump, the diaphragm pump being configured to oscillate a flexible diaphragm to variably alter the internal volume, thereby facilitating intake, pressurization, or ejection of the fluid through the conduit.

Clause 98. A method of using the system of any of the previous clauses.

Clause 99. A portable fluid tank system as described herein and as illustrated in the Figures.

Clause 100. A portable fluid tank system comprising any one or more of a fluid actuation system, an electronics housing, a mounting assembly, a spill face, a multi-state control interface, a communication module, a diaphragm pump, a battery compartment housing, a biasing element, a release button, a retention member, and/or mounting assembly as described herein.

Clause 101. A portable fluid tank system, comprising:

a fluid tank with an internal volume for holding fluid;

a fluid actuation system comprising a diaphragm pump, the diaphragm pump comprising a pump body that defines a pump chamber in fluid communication with the internal volume and a flexible diaphragm operable within the pump chamber to variably pressurize the fluid and facilitate movement of the fluid through a conduit;

an electronics housing defining a cavity to accommodate a removable energy storage device, the removable energy storage device configured to electrically couple and provide energy to the fluid actuation system;

a spill face integrally formed with the fluid tank, the spill face comprising an annular rim defining an aperture allowing for fluid ingress into or egress from the fluid tank, wherein the annular rim includes an upper segment and a lower segment with the upper segment being at a higher elevation than the lower segment and positioned in closer proximity to the electronics housing in comparison to the lower segment;

a multi-state control interface, positioned on an exterior of the portable fluid tank system, configured to enable transition between various states of operation of the fluid actuation system;

a communication module configured to interpret and execute command signals received from a remote transmitting device via a wireless communication network, wherein activation of the fluid actuation system can be effectuated through direct user interaction with the multi-state control interface or remotely via the remote transmitting device;

a first handle positioned on a top surface of the fluid tank, and a second handle positioned on a side surface of the fluid tank; and a mounting assembly coupled to the fluid tank, comprising a first engagement member being configured to mechanically engage with a complementary second engagement member of an external docking assembly, wherein engagement of the first engagement member and the second engagement member secures the portable fluid tank system to the external docking assembly.

Terminology

Any terms generally associated with circles, such as "radius" or "radial" or "diameter" or "circumference" or "circumferential" or any derivatives or similar types of terms are intended to be used to designate any corresponding structure in any type of geometry, not just circular structures. For example, "radial" as applied to another geometric structure should be understood to refer to a direction or distance between a location corresponding to a general geometric center of such structure to a perimeter of such structure; "diameter" as applied to another geometric structure should be understood to refer to a cross sectional width of such structure; and "circumference" as applied to another geometric structure should be understood to refer to a perimeter region. Nothing in this specification or drawings should be interpreted to limit these terms to only circles or circular structures.

Terms such as "substantially," "about," "approximately" or the like as used in referring to a relationship between two objects is intended to reflect not only an exact relationship but also variances in that relationship that may be due to various factors such as the effects of environmental conditions, common error tolerances, manufacturing variances, or the like. It should further be understood that although some values or other relationships may be expressed herein without a modifier, these values or other relationships may also be exact or may include a degree of variation due to various factors such as the effects of environmental conditions, common error tolerances, manufacturing variances, or the like.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Unless the context clearly requires otherwise, throughout the description and the claims, the words "include," "can include," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or" in reference to a list of two or more items, covers all of the following interpretations of the word: any one of the items in the list, all of the items in the list, and any combination of the items in the list. Likewise, the term "and/or" in reference to a list of two or more items, covers all of the following interpretations of the word: any one of the items in the list, all of the items in the list, and any combination of the items in the list.

Disjunctive language such as the phrase "at least one of X, Y, or Z," unless specifically stated otherwise, is otherwise understood with the context as used in general to present that an item, term, etc., may be either X, Y, or Z, or any combination thereof (non-limiting examples: X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the Detailed Description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described elsewhere herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

These and other changes can be made to the inventive concept in light of the Detailed Description. While the above description describes certain examples of the inventive concept, and describes the best mode contemplated, no matter how detailed the above appears in text, the inventive concept can be practiced in many ways. Details of the system may vary considerably in its specific implementation, while still being encompassed by the inventive concept disclosed herein. As noted above, particular terminology used when describing certain features or aspects of the inventive concept should not be taken to imply that the terminology is being redefined herein to be restricted to any specific characteristics, features, or aspects of the inventive concept with which that terminology is associated. In general, the terms used in the following claims should not be construed to limit the inventive concept to the specific examples disclosed in the specification, unless the above Detailed Description section explicitly defines such terms. Accordingly, the actual scope of the inventive concept encompasses not only the disclosed examples, but also all equivalent ways of practicing or implementing the inventive concept under the claims.

What is claimed is:

1. A portable fluid tank system, comprising:

a fluid tank comprising an internal volume for holding fluid;

a fluid actuation system configured to facilitate controlled movement and pressurization of the fluid in the fluid tank for ejection through a conduit;

an electronics housing defining a cavity to accommodate a removable energy storage device, the removable energy storage device configured to electrically couple and provide energy to the fluid actuation system; and a mounting assembly comprising a mounting frame configured to removably couple to an exterior of the fluid tank, the mounting assembly comprising a first engagement member integral with the mounting frame and configured to mechanically engage with a complementary second engagement member of an external docking assembly, wherein engagement of the first engagement member and the second engagement member secures the portable fluid tank system to the external docking assembly.

2. The system of claim 1, wherein the mounting frame extends around an entire periphery of an exterior surface of the fluid tank.

3. The system of claim 2, wherein the mounting frame fits against the exterior surface of the fluid tank to provide a substantially contiguous interface with the exterior surface of the fluid tank.

4. The system of claim 1, wherein the mounting frame is contoured to substantially match an exterior geometry of the fluid tank.

5. The system of claim 1, wherein the first engagement member comprises a pair of latch engaging structures and the second engagement member comprises a pair of latches.

6. The system of claim 5, wherein the latch engaging structures are disposed on opposite lateral sides of the fluid tank.

7. The system of claim 1, wherein the external docking assembly is part of a top surface of a container module, the container module being configured to provide storage for tools.

8. The system of claim 1, wherein the mounting assembly includes a series of slots configured to receive the second engagement member.

9. The system of claim 1, wherein the mounting assembly is part of a quick-connect coupling system on the fluid tank for easy attachment and detachment from external docking assemblies.

10. The system of claim 1, further comprising a spill face integrally formed with the fluid tank, the spill face including an annular rim that defines an aperture to allow for fluid ingress into or egress from the fluid tank, wherein the annular rim comprises an upper segment and a lower segment, with the upper segment positioned at a higher elevation compared to the lower segment and located in closer proximity to the electronics housing than the lower segment, the electronics housing defining a cavity to accommodate a removable energy storage device configured to electrically couple and provide energy to the portable fluid tank system.

11. The system of claim 1, further comprising:

a multi-state control interface, positioned on an exterior of the portable fluid tank system, the multi-state control interface configured to enable transition between various states of operation of the fluid actuation system; and a communication module configured to interpret and execute command signals received from a remote transmitting device via a wireless communication network, wherein activation of the fluid actuation system can be effectuated through direct user interaction with the multi-state control interface or remotely via the remote transmitting device.

12. The system of claim 1, further comprising:

a first handle positioned on a top surface of the fluid tank; and a second handle positioned on a side surface of the fluid tank.

13. The system of claim 1, wherein the fluid actuation system comprises a diaphragm pump, the diaphragm pump being configured to oscillate a flexible diaphragm to variably alter the internal volume, thereby facilitating intake, pressurization, and ejection of the fluid through the conduit.

* * * * *